(12) United States Patent
Nakayama et al.

(10) Patent No.: US 8,350,995 B2
(45) Date of Patent: Jan. 8, 2013

(54) OPTICAL FILM, PRODUCTION METHOD OF OPTICAL FILM, OPTICALLY-COMPENSATORY FILM, POLARIZING PLATE AND LIQUID CRYSTAL DISPLAY DEVICE

(75) Inventors: Hajime Nakayama, Kanagawa (JP); Yoji Ito, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1181 days.

(21) Appl. No.: 11/812,317

(22) Filed: Jun. 18, 2007

(65) Prior Publication Data

US 2008/0158490 A1    Jul. 3, 2008

(30) Foreign Application Priority Data

Jun. 19, 2006  (JP) .................................. 2006-168851

(51) Int. Cl.
*G02F 1/1335* (2006.01)
*G02B 6/10* (2006.01)
*C03B 37/022* (2006.01)

(52) U.S. Cl. ........... 349/117; 385/129; 385/131; 65/386

(58) Field of Classification Search ............ 385/13, 385/129–132; 349/117; 65/386
See application file for complete search history.

(56) References Cited

U.S. PATENT DOCUMENTS

| 2005/0234231 | A1* | 10/2005 | Hashimoto et al. | 536/58 |
| 2009/0116801 | A1* | 5/2009 | Fine | 385/129 |
| 2009/0326190 | A1* | 12/2009 | Merrill et al. | 528/502 B |

FOREIGN PATENT DOCUMENTS

JP      2004-4642 A    1/2004

* cited by examiner

*Primary Examiner* — Kevin S Wood
(74) *Attorney, Agent, or Firm* — Buchanan Ingersoll & Rooney PC

(57) ABSTRACT

A production method of an optical film, including: a stretching step of stretching a film, wherein the film has a longitudinal direction, a width direction and a thickness direction, wherein the stretching is in either of the longitudinal direction or the width direction of the film; and a shrinking step of shrinking the film in either of the longitudinal direction or the width direction of the film, that is not the direction in which the film is stretched, wherein the film thickness in the thickness direction is increased as compared with the film thickness before at least one of the stretching step and the shrinking step.

8 Claims, 2 Drawing Sheets

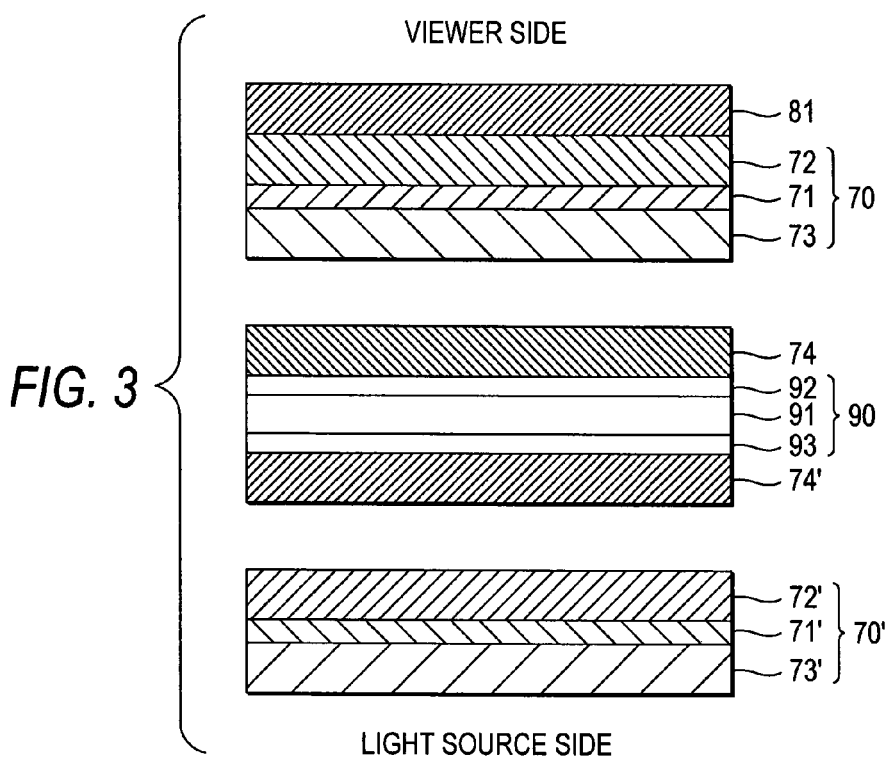
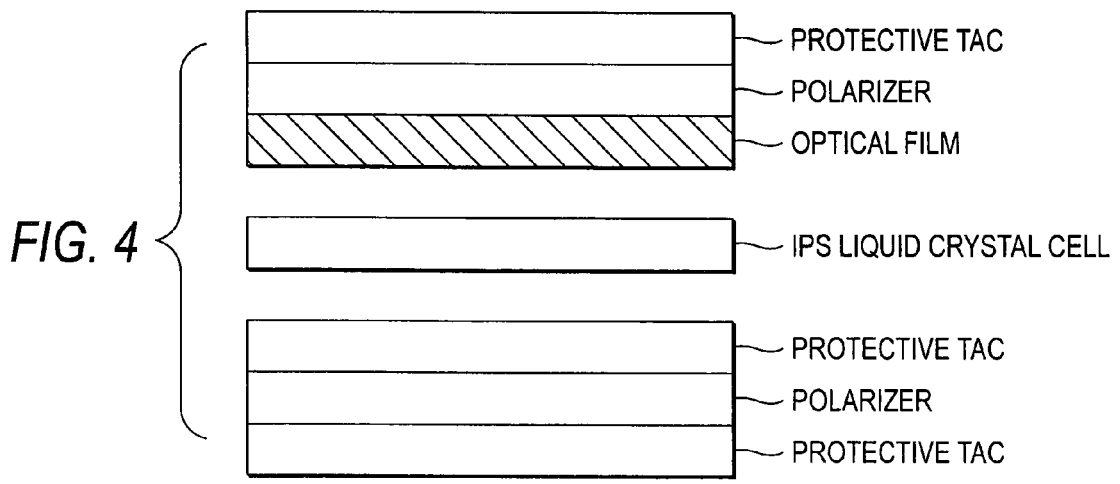

OPTICAL FILM, PRODUCTION METHOD OF OPTICAL FILM, OPTICALLY-COMPENSATORY FILM, POLARIZING PLATE AND LIQUID CRYSTAL DISPLAY DEVICE

BACKGROUND OF THE INVENTION

1. Field of the Invention

The present invention relates to an optical film having a high contrast ratio over a wide range and capable of suppressing the color shift, a production method of the optical film, and an optically-compensatory film, a polarizing plate and a liquid crystal display device each using the optical film.

2. Description of the Related Art

A liquid crystal display device is widely used for a monitor of personal computers or potable devices or for a television because of its various advantages such as low voltage/low power consumption and capability of size and thickness reduction. For such a liquid crystal display device, various modes are proposed according to the aligned state of liquid crystal molecules in the liquid crystal cell. Conventionally, a TN mode having such an aligned state as that liquid crystal molecules are twisted at about 90° toward the upper substrate from the lower substrate of the liquid crystal cell is predominating.

In general, a liquid crystal display device comprises a liquid crystal cell, an optically-compensatory sheet and a polarizer. The optically-compensatory sheet is used for canceling the image coloration or enlarging the viewing angle, and a film obtained by coating a liquid crystal on a stretched birefringent film or transparent film is used therefor.

However, the requirement with respect to the viewing angle dependency of a liquid crystal display device for televisions having a large screen and envisaging viewing from various angles is severe. To meet the requirement for more enhancement of the viewing angle characteristics, studies are being made on a liquid crystal display device different from the TN mode, such as IPS (in-plane switching) mode, OCB (optically compensatory bend) mode and VA (vertically aligned) mode. Particularly, the IPS mode ensures high contrast, good viewing angle characteristics and relatively high production yield and therefore, this mode is attracting attention as a liquid crystal display device for TV.

In the IPS mode, slight light leakage in the diagonal oblique incident direction at the black display time becomes a problem as a cause of reduction in the display quality. As one means for improving the color tone or viewing angle at black display, a technique of disposing an optically-compensatory material having birefringent characteristics between the liquid crystal layer and the polarizing plate is being studied also in the IPS mode. For example, there is disclosed an invention where light leakage based on the deviation of the crossing angle of polarization axes from the right angle when the crossed polarizing plates are viewed from the oblique direction is suppressed by using a phase difference film having Nz of 0.4 to 0.6 and an in-plane phase difference of 200 to 350 nm (see, JP-A-2004-4642 (the term "JP-A" as used herein means an "unexamined published Japanese patent application"))

SUMMARY OF THE INVENTION

However, in these methods, only the light leakage for a certain wavelength region (for example, green light near 550 nm) is reduced, and light leakage for other wavelength regions (for example, blue light near 450 nm or red light near 650 nm) is not taken into consideration. Therefore, the problem of so-called color shift which is a phenomenon that black display when obliquely observed is colored in blue or red cannot be overcome.

The present invention has been made under these circumstances and an object of the present invention is to provide an optical film having a high contrast ratio over a wide range and capable of suppressing the color shift, a production method of the optical film, an optical film produced by the production method, and an optically-compensatory film, a polarizing plate and a liquid crystal display device each using the optical film.

These objects can be attained by the following means [1] to [12].

[1] An optical film satisfying the following formulae (1) to (6):

$$150 \leq Re(550) \leq 400 \quad (1)$$

$$-100 \leq Rth(550) \leq 100 \quad (2)$$

$$0.1 < Re(450)/Re(550) < 0.95 \quad (3)$$

$$1.03 < Re(650)/Re(550) < 1.93 \quad (4)$$

$$0.4 < (Re(450)/Rth(450))/(Re(550)/Rth(550)) < 0.95 \quad (5)$$

$$1.05 < (Re(650)/Rth(650))/(Re(550)/Rth(550)) < 1.90, \quad (6)$$

wherein Re(450), Re(550) and Re(650) are an in-plane retardation value (unit: nm) measured with light at a wavelength of 450 nm, 550 nm and 650 nm, respectively, and Rth(450), Rth(550) and Rth(650) are a retardation value in a thickness-direction (unit: nm) measured with light at a wavelength of 450 nm, 550 nm and 650 nm, respectively.

[2] The optical film as described in [1], wherein the optical film comprises a cellulose acylate.

[3] The optical film as described in [1], which has the thickness of from 10 to 300 μm.

[4] A production method of an optical film, comprising:
a stretching step of stretching a film in either of the longitudinal direction or the width direction of the film; and
a shrinking step of shrinking the film in the other direction,
wherein the film thickness is increased as compared with the film thickness before at least one of the stretching step and the shrinking step.

[5] The production method as described in [4],
wherein the film thickness is increased by shrinking the film under heating.

[6] The production method as described in [4],
wherein the shrinking step is achieved by gripping the film with tenter clips, conveying the film, and narrowing the distance between the tenter clips in the conveying direction.

[7] The production method as descried in [4],
wherein the stretching step is achieved by gripping the film with tenter clips, conveying the film, and broadening the distance between the tenter clips in the conveying direction.

[8] An optical film produced by the production method as described in [4].

[9] An optically-compensatory film comprising:
the optical film as described in [1]; and
an optically anisotropic layer satisfying the following formula (7):

$$Re(550)=0 \text{ to } 200 \text{ (nm) and } |Rth(550)|=0 \text{ to } 300 \text{ (nm)}. \quad (7)$$

[10] A polarizing plate comprising the optical film as described in [1].

[11] A liquid crystal display device comprising the optical film as described in [1].

[12] The liquid crystal display device as described in [11], comprising a liquid crystal cell of IPS-mode.

[13] A liquid crystal display device comprising:
the polarizing plate as described in [10];
a polarizing plate that comprises an optical film satisfying the following formula (8) as a protective film of the polarizing plate; and
an IPS cell:

$|Re(550)|=0$ to 10 (nm) and $|Rth(550)|=0$ to 25 (nm).  (8)

[14] An optically-compensatory film comprising:
the optical film as described in [8]; and
an optically anisotropic layer satisfying the following formula (7):

$Re(550)=0$ to 200 (nm) and $|Rth(550)|=0$ to 300 (nm).  (7)

[15] A polarizing plate comprising the optical film as described in [8].

[16] A liquid crystal display device comprising the optical film as described in [8].

[17] The liquid crystal display device as described in [1,6], comprising a liquid crystal cell of IPS-mode.

[18] A liquid crystal display device comprising:
the polarizing plate as described in [1,5];
a polarizing plate that comprises an optical film satisfying the following formula (8) as a protective film of the polarizing plate; and
an IPS cell:

$|Re(550)|=0$ to 10 (nm) and $|Rth(550)|=0$ to 25 (nm).  (8)

BRIEF DESCRIPTION OF THE DRAWING

FIG. 3 is a view showing a construction example of the liquid crystal display device of the present invention;

FIG. 4 is a view for explaining the layer construction of the liquid crystal panel, employed in Examples,
wherein 70 denotes Polarizing Plate, 71 denotes Polarizer, 72 and 73 denote Protective film, 74 denotes Adhesive layer, 75 denote Glass for liquid crystal cell, and 81 denotes Functional layer.

DETAILED DESCRIPTION OF THE INVENTION

Figure 1:
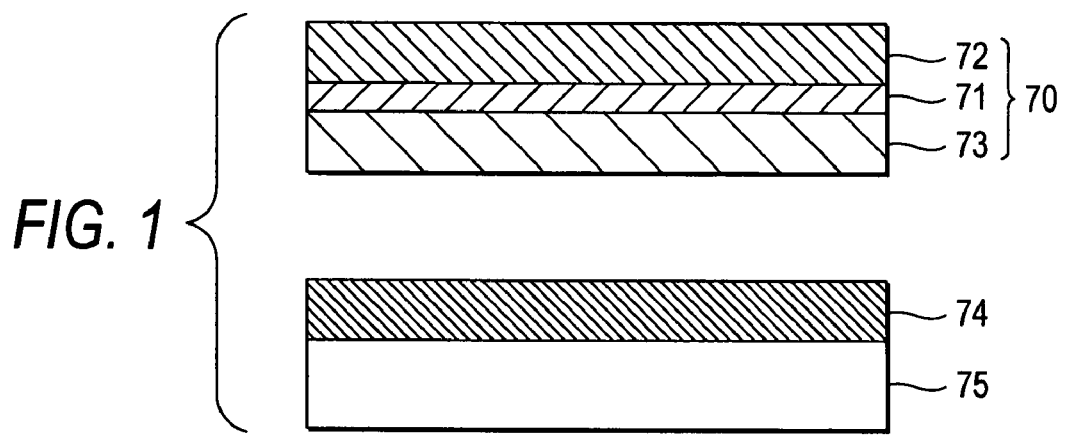
FIG. 1 is a view schematically showing the cross-sectional structure in one example of the polarizing plate of the present invention.

In the present invention, the terms "45°", "nearly in parallel" or "nearly at right angles" mean that the angle is in the range of exact angle ± less than 5°. The error from the exact angle is preferably less than 4°, more preferably less than 3°. As for the angle, "+" means the clockwise direction, and "−" means the counterclockwise direction. Also, the "slow axis" means the direction in which the refractive index becomes maximum, and the "visible light region" means a region of 380 to 780 nm. Furthermore, unless otherwise indicated, the refractive index is a value measured at a wavelength of $\lambda=550$ nm in the visible light region.

In the present specification, unless otherwise indicated, the term "polarizing plate" is used to include both a length polarizing plate and a polarizing plate cut (in the present specification, "cutting" includes "punching", "clipping" and the like). Also, the "polarizing film" and the "polarizing plate" are differentiated in the present specification, but the "polarizing plate" means a laminate where a transparent protective film for protecting the "polarizing film" is disposed on at least one surface of the polarizing film.

The optical properties, raw materials, production methods and the like of the optical film of the present invention are described in detail below.

[Optical Film]

The present invention relates to an optical film satisfying the following formulae (1) to (6):

$150 \leq Re(550) \leq 400$  (1)

$-100 \leq Rth(550) \leq 100$  (2)

$0.1 < Re(450)/Re(550) < 0.95$  (3)

$1.03 < Re(650)/Re(550) < 1.93$  (4)

$0.4 < (Re(450)/Rth(450))/(Re(550)/Rth(550)) < 0.95$  (5)

$1.05 < (Re(650)/Rth(650))/(Re(550)/Rth(550)) < 1.90$  (6)

(wherein Re(450), Re(550) and Re(650) are an in-plane retardation value (unit: nm) measured with light at a wavelength of 450 nm, 550 nm and 650 nm, respectively, and Rth(450), Rth(550) and Rth(650) are a retardation value in a thickness-direction (unit: nm) measured with light at a wavelength of 450 nm, 550 nm and 650 nm, respectively).

The present invention is characterized in that the film has an optical property causing the retardation of incident light to have wavelength dispersion differing between the normal direction and an oblique direction inclined with respect to the normal direction, for example, a direction at a polar angle of 60°, and this is aggressively used for optical compensation. The present invention is not limited by the display mode of the liquid crystal layer and can be used for a liquid crystal display device having a liquid crystal layer in any display mode such as VA mode, IPS mode, ECB mode, TN mode and OCB mode, but is preferably used particularly for an IPS mode.

The optical film of the present invention can be effectively used as a phase difference film having an optical compensation ability for a liquid crystal display device and contributes to enlarging the viewing angle contrast particularly of an IPS-mode liquid crystal display device and reducing the color shift dependent on the viewing angle. The optical film of the present invention may be disposed between the viewer-side polarizing plate and the liquid crystal cell, may be disposed between the backside polarizing plate and the liquid crystal cell, or may be disposed in both. For example, the optical film may be incorporated as an independent member into a liquid crystal display device or may be incorporated as one member of the polarizing plate into a liquid crystal display device by imparting the above-described optical property to the protective film protecting the polarizing film and allowing the protective film to function also as a phase difference film.

The formulae (3) and (4) represent a wavelength dispersion property of Re, and mean that, as the wavelength increases, the Re gets larger (inverse dispersion property). The formula (5) and (6) represent a relation between Re and Rth at each wavelength B (450 nm), G (550 nm) and R (650 nm), and mean that, in order to optically compensate a liquid crystal in a cell, which having a wavelength dispersion property that the phase difference is larger at a shorter wavelength and gets smaller as the wavelength increases, the inverse dispersion property of Re (formulae (3) and (4)) is required. They also mean that the increasing degree of the wavelength of Rth is smaller than the increasing degree of Re at B, G and R. It was found that by having the optical property, the optical film can suppress the tint change of the viewing angle on a liquid crystal display and the advantage of the invention can be obtained.

As described above, the optical film of the present invention must satisfy the following formulae (1) and (2):

$$150 \leq Re(550) \leq 400 \quad (1)$$

$$-100 \leq Rth(550) \leq 100 \quad (2)$$

preferably $$200 \leq Re(550) \leq 350 \quad (1\text{-}2)$$

$$-70 \leq Rth(550) \leq 70 \quad (2\text{-}2)$$

more preferably $$230 \leq Re(550) \leq 320 \quad (1\text{-}3)$$

$$-30 \leq Rth(550) \leq 30. \quad (2\text{-}3)$$

Also, the optical film of the present invention must satisfy the following formulae (3) to (6):

$$0.1 < Re(450)/Re(550) < 0.95 \quad (3)$$

$$1.03 < Re(650)/Re(550) < 1.93 \quad (4)$$

$$0.4 < (Re(450)/Rth(450))/(Re(550)/Rth(550)) < 0.95 \quad (5)$$

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Mathematical Formula (1)

$$1.05 < (Re(650)/Rth(650))/(Re(550)/Rth(550)) < 1.90 \quad (6)$$

preferably $$0.2 < Re(450)/Re(550) < 0.9 \quad (3\text{-}2)$$

$$1.05 < Re(650)/Re(550) < 1.9 \quad (4\text{-}2)$$

$$0.5 < (Re(450)/Rth(450))/(Re(550)/Rth(550)) < 0.9 \quad (5\text{-}2)$$

$$1.1 < (Re(650)/Rth(650))/(Re(550)/Rth(550)) < 1.8. \quad (6\text{-}2)$$

(In formulae (1) to (6), (1-2), (2-2), (1-3), (2-3) and (3-2) to (6-2), Re(450), Re(550) and Re(650) are an in-plane retardation value (unit: nm) measured with light at a wavelength of 450 nm, 550 nm and 650 nm, respectively, and Rth(450), Rth(550) and Rth(650) are a retardation value in a thickness-direction (unit: nm) measured with light at a wavelength of 450 nm, 550 nm and 650 nm, respectively).

(Measurement of Retardation)

In the present invention, $Re(\lambda)$ and $Rth(\lambda)$ indicate the in-plane retardation and the retardation in a thickness-direction, respectively, at a wavelength of $\lambda$. $Re(\lambda)$ is measured by making light at a wavelength of $\lambda$ mm to be incident in the film normal direction in KOBRA 21ADH or WR (manufactured by Oji Scientific Instruments).

In the case where the film measured is a film represented by a uniaxial or biaxial refractive index ellipsoid, the $Rth(\lambda)$ is calculated by the following method.

The retardation value is measured at 6 points in total by making light at a wavelength of $\lambda$ nm to be incident from directions inclined with respect to the film normal direction in 10° steps up to 50° on one side from the normal direction with the in-plane slow axis (judged by KOBRA 21ADH or WR) being used as the inclination axis (rotation axis) (when the slow axis is not present, an arbitrary direction in the film plane is used as the rotation axis) and based on the retardation values measured, the assumed values of average refractive index and the film thickness values input, $Rth(\lambda)$ is calculated by KOBRA 21ADH or WR.

In the above, when the film has a direction where the retardation value becomes zero at a certain inclination angle from the normal direction with the rotation axis being the in-plane slow axis, the retardation value at an inclination angle larger than that inclination angle is calculated by KOBRA 21 ADH or WR after converting its sign into a negative sign.

Incidentally, after measuring the retardation values from two arbitrary inclined direction by using the slow axis as the inclination axis (rotation axis) (when the slow axis is not present, an arbitrary direction in the film plane is used as the rotation axis), based on the values obtained, the assumed values of average refractive index and the film thickness values input, Rth can also be calculated according to the following formulae (1) and (2).

$Re(\theta)$ represents a retardation value in the direction inclined at an angle of θ from the normal direction. In mathematical formula (1), nx represents a refractive index in the in-plane slow axis direction, ny represents a refractive index in the direction crossing with nx at right angles in the plane, and nz represents a refractive index crossing with nx and ny at right angles.

$$Rth = \left(\frac{nx + ny}{2} - nz\right) \times d$$

Mathematical Formula (2)

In the case where the film measured is a film incapable of being represented by a uniaxial or biaxial refractive index ellipsoid or a film having no optic axis, Rth(X) is calculated by the following method.

The retardation value is measured at 11 points by making light at a wavelength of λ nm to be incident from directions inclined with respect the film normal direction in 10° steps from −50° to +50° with the in-plane slow axis (judged by KOBRA 21ADH or WR) being used as the inclination axis (rotation axis) and based on the retardation values measured, the assumed values of average refractive index and the film thickness values input, $Rth(\lambda)$ is calculated by KOBRA 21ADH or WR.

In the measurement above, as for the assumed value of average refractive index, those described in *Polymer Handbook* (John Wiley & Sons, Inc.) and catalogues of various optical films can be used. The average refractive index of which value is unknown can be measured by an Abbe refractometer.

The values of average refractive index of main optical films are as follows: cellulose acylate (1.48), cycloolefin polymer (1.52), polycarbonate (1.59), polymethyl methacrylate (1.49) and polystyrene (1.59). When such an assumed value of average refractive index and the film thickness are input, KOBRA 21ADH or WR calculates nx, ny and nz and from these calculated nx, ny and nz, Nz=(nx−nz)/(nx−ny) is further calculated.

The thickness of the optical film is not particularly limited but is from 10 to 300 μm, preferably from 40 to 250 μm, more preferably from 60 to 250 μm, still more preferably from 80 to 200 μm.

The polymer material mainly constituting the optical film of the present invention satisfying the above-described characteristics is specifically described below.

[Material of Optical Film]

The material forming the optical film of the present invention is preferably a polymer excellent in optical transparency, mechanical strength, thermal stability, moisture blocking property, isotropy and the like and as long as the wavelength dispersion of Re and the wavelength dispersion of Rth satisfy formulae (3) to (6), any material may be used. Examples thereof include a polycarbonate-based polymer, a polyester-based polymer such as polyethylene terephthalate and polyethylene naphthalate, an acryl-based polymer such as polymethyl methacrylate, and a styrene-based polymer such as polystyrene and acrylonitrile.styrene copolymer (AS resin). Other examples include a polyolefin such as polyethylene and polypropylene, a polyolefin-based polymer such as ethylene.propylene copolymer, a vinyl chloride-based polymer, an amide-based polymer such as nylon and aromatic polyamide, an imide-based polymer, a sulfone-based polymer, a polyethersulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer and a polymer obtained by mixing these polymers. The optical film of the present invention can also be formed as a cured layer of an ultraviolet-curable or heat-curable resin such as acryl type, urethane type, acrylurethane type, epoxy type and silicone type.

Also, a thermoplastic norbornene-based resin can be preferably used as the material forming the optical film of the present invention. Examples of the thermoplastic norbornene-based resin include Zeonex and Zeonoah produced by Zeon Corp., and Arton produced by JSR.

Furthermore, a cellulose-based polymer (hereinafter referred to as a "cellulose acylate") as represented by triacetyl cellulose, which has been conventionally used as the transparent protective film of a polarizing plate, can also be preferably used as the material forming the optical film of the present invention. The cellulose acylate is described in detail below.

[Raw Material Cotton of Cellulose Acylate]

Examples of the cellulose as the raw material of cellulose acylate used for the optical film of the present invention include cotton linter and wood pulp (e.g., hardwood pulp, softwood pulp). A cellulose acylate obtained from any raw material cellulose may be used and depending on the case, a mixture of raw material celluloses may be used. These raw material celluloses are described in detail, for example, in Maruzawa and Uda, *Plastic Zairvo Koza* (17), *Seni-kei Jushi* (*Plastic Material Lecture* (17), *Fiber-Based Resin*), Nikkan Kogyo Shinbun Sha (1970), and *JIII Journal of Technical Disclosure*, No. 2001-1745, pp. 7-8, Japan Institute of Invention and Innovation, and celluloses described therein can be used. The cellulose acylate film is not particularly limited.

[Cellulose Acylate Substitution Degree]

The cellulose acylate produced using the above-described cellulose as the raw material is described below. The cellulose acylate is a cellulose of which hydroxyl group is acylated, and the substituent may be any acyl group having a carbon atom number of 2 (acetyl group) to 22. In the cellulose acylate, the substitution degree to the hydroxyl group of cellulose is not particularly limited. The substitution degree can be obtained by calculation after measuring the bonding degree of an acetic acid and/or a fatty acid having a carbon number of 3 to 22, substituted to the hydroxyl group of cellulose. As for the measuring method, the measurement may be performed according to ASTM D-817-91.

As described above, in the cellulose acylate, the substitution degree to the hydroxyl group of cellulose is not particularly limited, but the acyl substitution degree to the hydroxyl group of cellulose is preferably from 2.50 to 3.00, more preferably from 2.56 to 3.00, still more preferably from 2.75 to 3.00.

Out of the acetic acid and/or fatty acid having a carbon number of 3 to 22 substituted to the hydroxyl group of cellulose, the acyl group having a carbon number of 3 to 22 is not particularly limited and may be an aliphatic group or an allyl group or may be a single acyl group or a mixture of two or more acyl groups. Examples thereof include an alkylcarbonyl ester of cellulose, an alkenylcarbonyl ester of cellulose, an aromatic carbonyl ester of cellulose, and an aromatic alkylcarbonyl ester of cellulose, and these esters each may further have a substituted group. Preferred examples of the acyl group therefor include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleoyl group, a benzoyl group, a naphthylcarbonyl group and a cinnamoyl group. Among these, preferred are acetyl, propionyl, butanoyl, dodecanoyl, octadecanoyl, tert-butanoyl, oleoyl, benzoyl, naphthylcarbonyl and cinnamoyl, and more preferred are acetyl, propionyl and butanoyl.

The present inventors have made intensive studies, as a result, it is found that in the case where the acyl substituent substituted to the hydroxyl group of cellulose is substantially two kinds of acyl groups selected from an acetyl group, a propionyl group and a butanoyl group, the optical anisotropy of the cellulose acylate film can be decreased when the entire substitution degree is from 2.50 to 3.00. The acyl substitution degree is more preferably from 2.60 to 3.00, still more preferably from 2.65 to 3.00.

[Polymerization Degree of Cellulose Acylate]

The polymerization degree of the cellulose acylate preferably used in the present invention is, in terms of the viscosity average polymerization degree, preferably from 180 to 700, and in the case of cellulose acetate, more preferably from 180 to 550, still more preferably from 180 to 400, yet still more preferably from 180 to 350. If the polymerization degree is too high, the viscosity of the dope solution of cellulose acylate becomes high and a film can be hardly produced by casting, whereas if the polymerization degree is too low, the strength of the film produced may decrease. The average polymerization degree can be measured according to the intrinsic viscosity method proposed by Uda, et al. (Kazuo Uda and Hideo Saito, *Journal of the Society of Fiber Science and Technology, Japan*, Vol. 18, No. 1, pp. 105-120 (1962)). Furthermore, this is described in detail in JP-A-9-95538.

Particularly, when the transparent film of the present invention is produced using a cellulose acylate in which the acyl substituent substantially comprises only an acetyl group and the average polymerization degree is from 180 to 550, good performance can be exerted.

The molecular weight distribution of the cellulose acylate preferably used in the present invention is evaluated by gal permeation chromatography, and it is preferred that the polydispersity index Mw/Mn (Mw is a mass average molecular weight and Mn is a number average molecular weight) is small and the molecular weight distribution is narrow. The polydispersity index is preferably from 2.0 to 4.0, more preferably from 2.0 to 3.5, and most preferably from 2.3 to 3.3.

When low molecular components are removed, this is useful because the viscosity becomes lower than normal cellulose acylates, though the average molecular weight (polymerization degree) increases. The cellulose acylate having a small low molecular component content can be obtained by removing low molecular components from a cellulose acylate synthesized through a normal process. The low molecular components can be removed by washing the cellulose acylate with an appropriate organic solvent. In the case of producing a cellulose acylate having a small low molecular component content, the amount of the sulfuric acid catalyst in the acetylation reaction is preferably adjusted to 0.5 to 25 parts by mass per 100 parts by mass of the cellulose. When the amount of the sulfuric acid catalyst is adjusted to this range, a cellulose acylate advantageous also in terms of the molecular weight distribution (uniform molecular weight distribution) can be synthesized. In use at the production of a cellulose acylate, the cellulose acylate preferably has a water content of 2 mass % or less, more preferably 1 mass % or less, still more preferably 0.7 mass % or less. The cellulose acylate generally contains water and the water content thereof is known to be from 2.5 to 5 mass %. In the present invention, in order to achieve the above-described water content of cellulose acylate, the cellulose acylate needs to be dried, and the method therefor is not particularly limited as long as the objective water content can be attained. As regards such a cellulose acylate for use in the present invention, the raw material cotton and synthesis method are described in detail in *JIII Journal of Technical Disclosure*, No. 2001-1745, pp. 7-12, Japan Institute of Invention and Innovation (Mar. 15, 2001).

The substituent, substitution degree, polymerization degree, molecular weight distribution and the like of the cellulose acylate each is preferably in the above-described range, and either a single cellulose acylate or a mixture of two or more kinds of cellulose acylates may be used.

[Additives to Optical Film]

In the optical film solution of the present invention, various additives (for example, a retardation developer, a retardation decreasing agent, a wavelength-dispersion adjusting agent, an ultraviolet inhibitor, a plasticizer, a deterioration inhibitor, a fine particle and an optical property adjusting agent) can be added in each production step. These additives are described below. As for the timing of addition, the additives may be added at any time in the dope production step, and a step of adding additives to prepare a dope may be added as a final production step of the dope preparation step.

In the optical film of the present invention, a retardation developer comprising a discotic compound or a rod-like compound can be preferably used as the compound for increasing the retardation.

(Retardation Developer)

The optical film of the present invention may contain one or more kinds of a retardation developer comprising a discotic compound or a rod-like compound so as to increase the wavelength dispersion of Rth on the short wave side and create forward dispersion. By virtue of the retardation developer, the in-plane retardation Re and the retardation Rth in a thickness-direction each can be made close to the desired value and furthermore, Re and Rth at respective wavelengths can have good wavelength-dispersion property satisfying formulae (3) to (6). Particularly, in the present invention, the wavelength dispersion of Re can be made to fall in the desired range by the above-described stretching operation of the optical film and therefore, the retardation developer not only promotes the development of Re but also helps the wavelength dispersion of mainly Rth come close to a value in the desired range. The wavelength of Rth is presumed to come close to a value in the desired range because the discotic or rod-like compound having absorption in the short wave region is oriented nearly in the horizontal alignment and this allows Rth in the short wave region to become relatively high compared to the long wave side.

In order to make Rth in the short wave region relatively high compared with the long wave side, either a discotic compound or a rod-like compound can be preferably used, but in view of ability of being oriented nearly in the horizontal alignment in the film, a discotic compound is more preferred.

The retardation developer is a compound capable of increasing the Re and Rth values by 0.11 or more per micron of the film thickness when added in an amount of 1 part by mass per 100 parts by mass of the polymer component such as cellulose acylate (hereinafter sometimes referred to as a "polymer component") contained in the optical film of the present invention. A compound capable of increasing the retardation by 0.2 or more per micron of the film thickness is more preferred, and a compound capable of increasing the retardation by 0.3 or more per micron of the film thickness is still more preferred.

The retardation developer for use in the present invention includes those comprising a rod-like or discotic compound.

As for the discotic or rod-like compound, a compound having at least two aromatic rings can be used.

The discotic retardation developer is preferably used in a range from 0.05 to 30 parts by mass, more preferably from 0.1 to 20 parts by mass, still more preferably from 0.2 to 15 parts by mass, and most preferably from 0.5 to 10 parts by mass, per 100 parts by mass of the polymer component.

The amount added of the retardation developer comprising a rod-like compound is preferably from 0.1 to 30 parts y mass, more preferably from 0.5 to 20 parts by mass, per 100 parts by mass of the polymer component.

The discotic compound is more excellent in the Rth retardation developing property than the rod-like compound and therefore, is preferably used particularly when large Rth retardation is required.

Two or more kinds of retardation developers may be used in combination.

The retardation developer comprising a rod-like or discotic compound preferably has substantially no absorption in the visible region.

(Discotic Compound)

Specific examples of the retardation developer comprising a discotic compound, which is preferably used in the present invention, are described below, but the present invention is not limited thereto.

In the present invention, a compound represented by the following formula (1) can be preferably used as the retardation developer comprising a discotic compound. The compound represented by formula (1) is preferred because the molecular structure has a rotation symmetry around a triazine ring to ensure high retardation developing property and the production cost is low.

Formula (1):

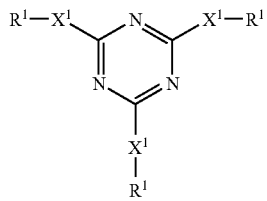

In formula (1):

Each $R^1$ independently represents an aromatic ring having a substituent at least at any one position of the ortho-position, the meta-position and the para-position, or a heterocyclic ring.

Each $X^1$ independently represents a single bond or —$NR^3$—, wherein each $R^3$ independently represents a hydrogen atom, a substituted or unsubstituted alkyl group, an alkenyl group, an aryl group or a heterocyclic group.

The aromatic ring represented by $R^1$ is preferably phenyl or naphthyl, more preferably phenyl.

The aromatic ring represented by $R^1$ may have at least one substituent at any substitution site. Examples of the substituents include a halogen atom, a hydroxyl group, a cyano group, a nitro group, a carboxyl group, an alkyl group, an alkenyl group, an aryl group, an alkoxyl group, an alkenyloxy group, an aryloxy group, an acyloxy group, an alkoxycarbonyl group, an alkenyloxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group.

The heterocyclic group represented by $R^1$ preferably has aromaticity. The heterocyclic group having aromaticity is generally an unsaturated heterocyclic ring, and a heterocyclic ring having a largest number of double bonds is preferred. The heterocyclic ring is preferably a 5-, 6- or 7-membered ring, more preferably a 5- or 6-membered ring, and most preferably a 6-membered ring. The heteroatom of the heterocyclic ring is preferably a nitrogen atom, a sulfur atom or an oxygen atom, more preferably a nitrogen atom. As for the heterocyclic ring having aromaticity, a pyridine ring (the heterocyclic group is 2-pyridyl or 4-pyridyl) is particularly preferred. The heterocyclic group may have a substituent. Examples of the substituent of the heterocyclic group are the same as those of the substituent of the aryl moiety above.

When $X^1$ is a single bond, the heterocyclic group is preferably a heterocyclic group having a free valence on the nitrogen atom. The heterocyclic group having a free valence on the nitrogen atom is preferably a 5-, 6- or 7-membered ring, more preferably a 5- or 6-membered ring, and most preferably 5-membered ring. The heterocyclic group may have a plurality of nitrogen atoms. The heterocyclic group may have a heteroatom (e.g., O, S) other than a nitrogen atom. Examples of the heterocyclic groups having a free valence on the nitrogen atom are set forth below.

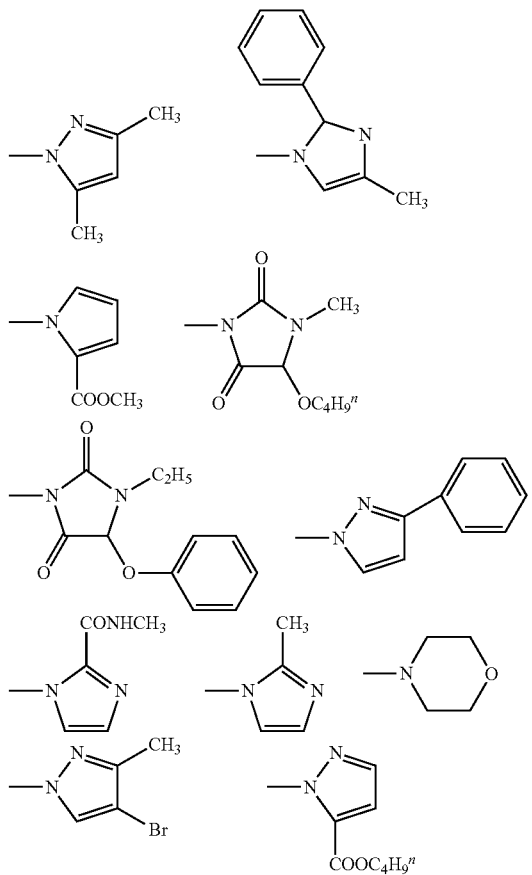

In formula (1), $X^1$ represents a single bond or —$NR^3$—. $R^3$ independently represents a hydrogen atom, a substituted or unsubstituted alkyl group, an alkenyl group, an aryl group or a heterocyclic group.

The alkyl group represented by $R^3$ may be a cyclic alkyl group or a chain alkyl group but is preferably a chain alkyl group, and a linear chain alkyl group is more preferred than a branched chain alkyl group. The number of carbon atoms in the alkyl group is preferably from 1 to 30, more preferably from 1 to 20, still more preferably from 1 to 10, yet still more preferably from 1 to 8, and most preferably from 1 to 6. The alkyl group may have a substituent, and examples of the substituent include a halogen atom, an alkoxyl group (e.g., methoxy, ethoxy) and an acyloxy group (e.g., acryloyloxy, methacryloyloxy).

The alkenyl group represented by $R^3$ may be a cyclic alkenyl group or a chain alkenyl group but is preferably a chain alkenyl group, and a linear chain alkenyl group is more preferred than a branched chain alkenyl group. The number of carbon atoms in the alkenyl group is preferably from 2 to 30, more preferably from 2 to 20, still more preferably from 2 to 10, yet still more preferably from 2 to 8, and most preferably from 2 to 6. The alkenyl group may have a substituent, and examples of the substituent are the same as those of the substituent of the alkyl group.

The aromatic ring group and heterocyclic group represented by $R^3$ are the same as the aromatic ring group and heterocyclic group represented by $R^1$, and preferred ranges are also the same. The aromatic ring group and heterocyclic group each may further have a substituent, and examples of the substituent are the same as those of the substituent of the aromatic ring group and heterocyclic group represented by $R^1$.

The molecular weight of the retardation developer comprising a discotic compound represented by formula (1) is preferably from 300 to 800.

Together with the retardation developer comprising a discotic compound represented by formula (1), a UV absorbent may be used in combination. The amount of the UV absorbent used is preferably 10 parts by mass or less, more preferably 3 parts by mass or less, per 100 parts by mass of the retardation developer comprising a discotic compound represented by formula (1).

Specific examples of the retardation developer comprising a discotic compound represented by formula (1) for use in the present invention are set forth below. A plurality of Rs in each example represent the same group. The definition of R is shown after the formula together with the compound number. (1) to (66):

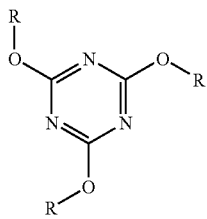

(1) phenyl
(2) 3-ethoxycarbonylphenyl
(3) 3-butoxyphenyl
(4) m-biphenylyl
(5) 3-phenylthiophenyl
(6) 3-chlorophenyl
(7) 3-benzoylphenyl
(8) 3-acetoxyphenyl
(9) 3-benzoyloxyphenyl
(10) 3-phenoxycarbonylphenyl
(11) 3-methoxyphenyl
(12) 3-anilinophenyl
(13) 3-isobutyrylaminophenyl
(14) 3-phenoxycarbonylaminophenyl
(15) 3-(3-ethylureido)phenyl
(16) 3-(3,3-diethylureido)phenyl
(17) 3-methylphenyl
(18) 3-phenoxyphenyl
(19) 3-hydroxyphenyl
(20) 4-ethoxycarbonylphenyl
(21) 4-butoxyphenyl
(22) p-biphenylyl
(23) 4-phenylthiophenyl
(24) 4-chlorophenyl
(25) 4-benzoylphenyl
(26) 4-acetoxyphenyl
(27) 4-benzoyloxyphenyl
(28) 4-phenoxycarbonylphenyl
(29) 4-methoxyphenyl
(30) 4-anilinophenyl
(31) 4-isobutyrylaminophenyl
(32) 4-phenoxycarbonylaminophenyl
(33) 4-(3-ethylureido)phenyl
(34) 4-(3,3-diethylureido)phenyl
(35) 4-methylphenyl
(36) 4-phenoxyphenyl
(37) 4-hydroxyphenyl
(38) 3,4-diethoxycarbonylphenyl
(39) 3,4-dibutoxyphenyl
(40) 3,4-diphenylphenyl
(41) 3,4-diphenylthiophenyl
(42) 3,4-dichlorophenyl
(43) 3,4-dibenzoylphenyl
(44) 3,4-diacetoxyphenyl
(45) 3,4-dibenzoyloxyphenyl
(46) 3,4-diphenoxycarbonylphenyl
(47) 3,4-dimethoxyphenyl
(48) 3,4-dianilinophenyl
(49) 3,4-dimethylphenyl
(50) 3,4-diphenoxyphenyl
(51) 3,4-dihydroxyphenyl
(52) 2-naphthyl
(53) 3,4,5-triethoxycarbonylphenyl
(54) 3,4,5-tributoxyphenyl
(55) 3,4,5-triphenylphenyl
(56) 3,4,5-triphenylthiophenyl
(57) 3,4,5-trichlorophenyl
(58) 3,4,5-tribenzoylphenyl
(59) 3,4,5-triacetoxyphenyl
(60) 3,4,5-tribenzoyloxyphenyl
(61) 3,4,5-triphenoxycarbonylphenyl
(62) 3,4,5-trimethoxyphenyl
(63) 3,4,5-trianilinophenyl
(64) 3,4,5-trimethylphenyl
(65) 3,4,5-triphenoxyphenyl
(66) 3,4,5-trihydroxyphenyl
(67) to (132):

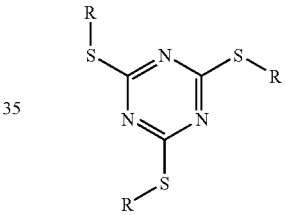

(67) phenyl
(68) 3-ethoxycarbonylphenyl
(69) 3-butoxyphenyl
(70) m-biphenylyl
(71) 3-phenylthiophenyl
(72) 3-chlorophenyl
(73) 3-benzoylphenyl
(74) 3-acetoxyphenyl
(75) 3-benzoyloxyphenyl
(76) 3-phenoxycarbonylphenyl
(77) 3-methoxyphenyl
(78) 3-anilinophenyl
(79) 3-isobutyrylaminophenyl
(80) 3-phenoxycarbonylaminophenyl
(81) 3-(3-ethylureido)phenyl
(82) 3-(3,3-diethylureido)phenyl
(83) 3-methylphenyl
(84) 3-phenoxyphenyl
(85) 3-hydroxyphenyl
(86) 4-ethoxycarbonylphenyl
(87) 4-butoxyphenyl
(88) p-biphenylyl
(89) 4-phenylthiophenyl
(90) 4-chlorophenyl
(91) 4-benzoylphenyl
(92) 4-acetoxyphenyl
(93) 4-benzoyloxyphenyl

(94) 4-phenoxycarbonylphenyl
(95) 4-methoxyphenyl
(96) 4-anilinophenyl
(97) 4-isobutyrylaminophenyl
(98) 4-phenoxycarbonylaminophenyl
(99) 4-(3-ethylureido)phenyl
(100) 4-(3,3-diethylureido)phenyl
(101) 4-methylphenyl
(102) 4-phenoxyphenyl
(103) 4-hydroxyphenyl
(104) 3,4-diethoxycarbonylphenyl
(105) 3,4-dibutoxyphenyl
(106) 3,4-diphenylphenyl
(107) 3,4-diphenylthiophenyl
(108) 3,4-dichlorophenyl
(109) 3,4-dibenzoylphenyl
(110) 3,4-diacetoxyphenyl
(111) 3,4-dibenzoyloxyphenyl
(112) 3,4-diphenoxycarbonylphenyl
(113) 3,4-dimethoxyphenyl
(114) 3,4-dianilinophenyl
(115) 3,4-dimethylphenyl
(116) 3,4-diphenoxyphenyl
(117) 3,4-dihydroxyphenyl
(118) 2-naphthyl
(119) 3,4,5-triethoxycarbonylphenyl
(120) 3,4,5-tributoxyphenyl
(121) 3,4,5-triphenylphenyl
(122) 3,4,5-triphenylthiophenyl
(123) 3,4,5-trichlorophenyl
(124) 3,4,5-tribenzoylphenyl
(125) 3,4,5-triacetoxyphenyl
(126) 3,4,5-tribenzoyloxyphenyl
(127) 3,4,5-triphenoxycarbonylphenyl
(128) 3,4,5-trimethoxyphenyl
(129) 3,4,5-trianilinophenyl
(130) 3,4,5-trimethylphenyl
(131) 3,4,5-triphenoxyphenyl
(132) 3,4,5-trihydroxyphenyl
(133) to (330):

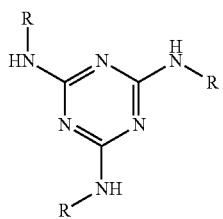

(133) phenyl
(134) 4-butylphenyl
(135) 4-(2-methoxy-2-ethoxyethyl)phenyl
(136) 4-(5-nonenyl)phenyl
(137) p-biphenylyl
(138) 4-ethoxycarbonylphenyl
(139) 4-butoxyphenyl
(140) 4-methylphenyl
(141) 4-chlorophenyl
(142) 4-phenylthiophenyl
(143) 4-benzoylphenyl
(144) 4-acetoxyphenyl
(145) 4-benzoyloxyphenyl
(146) 4-phenoxycarbonylphenyl
(147) 4-methoxyphenyl
(148) 4-anilinophenyl
(149) 4-isobutyrylaminophenyl
(150) 4-phenoxycarbonylaminophenyl
(151) 4-(3-ethylureido)phenyl
(152) 4-(3,3-diethylureido)phenyl
(153) 4-phenoxyphenyl
(154) 4-hydroxyphenyl
(155) 3-butylphenyl
(156) 3-(2-methoxy-2-ethoxyethyl)phenyl
(157) 3-(5-nonenyl)phenyl
(158) m-biphenylyl
(159) 3-ethoxycarbonylphenyl
(160) 3-butoxyphenyl
(161) 3-methylphenyl
(162) 3-chlorophenyl
(163) 3-phenylthiophenyl
(164) 3-benzoylphenyl
(165) 3-acetoxyphenyl
(166) 3-benzoyloxyphenyl
(167) 3-phenoxycarbonylphenyl
(168) 3-methoxyphenyl
(169) 3-anilinophenyl
(170) 3-isobutyrylaminophenyl
(171) 3-phenoxycarbonylaminophenyl
(172) 3-(3-ethylureido)phenyl
(173) 3-(3,3-diethylureido)phenyl
(174) 3-phenoxyphenyl
(175) 3-hydroxyphenyl
(176) 2-butylphenyl
(177) 2-(2-methoxy-2-ethoxyethyl)phenyl
(178) 2-(5-nonenyl)phenyl
(179) o-biphenylyl
(180) 2-ethoxycarbonylphenyl
(181) 2-butoxyphenyl
(182) 2-methylphenyl
(183) 2-chlorophenyl
(184) 2-phenylthiophenyl
(185) 2-benzoylphenyl
(186) 2-acetoxyphenyl
(187) 2-benzoyloxyphenyl
(188) 2-phenoxycarbonylphenyl
(189) 2-methoxyphenyl
(190) 2-anilinophenyl
(191) 2-isobutyrylaminophenyl
(192) 2-phenoxycarbonylaminophenyl
(193) 2-(3-ethylureido)phenyl
(194) 2-(3,3-diethylureido)phenyl
(195) 2-phenoxyphenyl
(196) 2-hydroxyphenyl
(197) 3,4-dibutylphenyl
(198) 3,4-di(2-methoxy-2-ethoxyethyl)phenyl
(199) 3,4-diphenylphenyl
(200) 3,4-diethoxycarbonylphenyl
(201) 3,4-didodecyloxyphenyl
(202) 3,4-dimethylphenyl
(203) 3,4-dichlorophenyl
(204) 3,4-dibenzoylphenyl
(205) 3,4-diacetoxyphenyl
(206) 3,4-dimethoxyphenyl
(207) 3,4-di-N-methylaminophenyl
(208) 3,4-diisobutyrylaminophenyl
(209) 3,4-diphenoxyphenyl
(210) 3,4-dihydroxyphenyl
(211) 3,5-dibutylphenyl
(212) 3,5-di(2-methoxy-2-ethoxyethyl)phenyl
(213) 3,5-diphenylphenyl
(214) 3,5-diethoxycarbonylphenyl (215) 3,5-didodecyloxyphenyl
(216) 3,5-dimethylphenyl
(217) 3,5-dichlorophenyl
(218) 3,5-dibenzoylphenyl
(219) 3,5-diacetoxyphenyl
(220) 3,5-dimethoxyphenyl
(221) 3,5-di-N-methylaminophenyl
(222) 3,5-diisobutyrylaminophenyl
(223) 3,5-diphenoxyphenyl
(224) 3,5-dihydroxyphenyl
(225) 2,4-dibutylphenyl
(226) 2,4-di(2-methoxy-2-ethoxyethyl)phenyl
(227) 2,4-diphenylphenyl
(228) 2,4-diethoxycarbonylphenyl
(229) 2,4-didodecyloxyphenyl
(230) 2,4-dimethylphenyl
(231) 2,4-dichlorophenyl
(232) 2,4-dibenzoylphenyl
(233) 2,4-diacetoxyphenyl
(234) 2,4-dimethoxyphenyl
(235) 2,4-di-N-methylaminophenyl
(236) 2,4-diisobutyrylaminophenyl
(237) 2,4-diphenoxyphenyl
(238) 2,4-dihydroxyphenyl
(239) 2,3-dibutylphenyl
(240) 2,3-di(2-methoxy-2-ethoxyethyl)phenyl
(241) 2,3-diphenylphenyl
(242) 2,3-diethoxycarbonylphenyl
(243) 2,3-didodecyloxyphenyl
(244) 2,3-dimethylphenyl
(245) 2,3-dichlorophenyl
(246) 2,3-dibenzoylphenyl
(247) 2,3-diacetoxyphenyl
(248) 2,3-dimethoxyphenyl
(249) 2,3-di-N-methylaminophenyl
(250) 2,3-diisobutyrylaminophenyl
(251) 2,3-diphenoxyphenyl
(252) 2,3-dihydroxy phenyl
(253) 2,6-dibutylphenyl
(254) 2,6-di(2-methoxy-2-ethoxyethyl)phenyl
(255) 2,6-diphenylphenyl
(256) 2,6-diethoxycarbonylphenyl
(257) 2,6-didodecyloxyphenyl
(258) 2,6-dimethylphenyl
(259) 2,6-dichlorophenyl
(260) 2,6-dibenzoylphenyl
(261) 2,6-diacetoxyphenyl
(262) 2,6-dimethoxyphenyl
(263) 2,6-di-N-methylaminophenyl
(264) 2,6-diisobutyrylaminophenyl
(265) 2,6-diphenoxyphenyl
(266) 2,6-dihydroxyphenyl
(267) 3,4,5-tributylphenyl
(268) 3,4,5-tri(2-methoxy-2-ethoxyethyl)phenyl
(269) 3,4,5-triphenylphenyl
(270) 3,4,5-triethoxycarbonylphenyl
(271) 3,4,5-tridodecyloxyphenyl
(272) 3,4,5-trimethylphenyl
(273) 3,4,5-trichlorophenyl
(274) 3,4,5-tribenzoylphenyl
(275) 3,4,5-triacetoxyphenyl
(276) 3,4,5-trimethoxyphenyl
(277) 3,4,5-tri-N-methylaminophenyl
(278) 3,4,5-triisobutyrylaminophenyl
(279) 3,4,5-triphenoxyphenyl
(280) 3,4,5-trihydroxyphenyl
(281) 2,4,6-tributylphenyl
(282) 2,4,6-tri(2-methoxy-2-ethoxyethyl)phenyl
(283) 2,4,6-triphenylphenyl
(284) 2,4,6-triethoxycarbonylphenyl
(285) 2,4,6-tridodecyloxyphenyl
(286) 2,4,6-trimethylphenyl
(287) 2,4,6-trichlorophenyl
(288) 2,4,6-tribenzoylphenyl
(289) 2,4,6-triacetoxyphenyl
(290) 2,4,6-trimethoxyphenyl
(291) 2,4,6-tri-N-methylaminophenyl
(292) 2,4,6-triisobutyrylaminophenyl
(293) 2,4,6-triphenoxyphenyl
(294) 2,4,6-trihydroxyphenyl
(295) pentafluorophenyl
(296) pentachlorophenyl
(297) pentamethoxyphenyl
(298) 6-N-methylsulfamoyl-8-methoxy-2-naphthyl
(299) 5-N-methylsulfamoyl-2-naphthyl
(300) 6-N-phenylsulfamoyl-2-naphthyl
(301) 5-ethoxy-7-N-methylsulfamoyl-2-naphthyl
(302) 3-methoxy-2-naphthyl
(303) 1-ethoxy-2-naphthyl
(304) 6-N-phenylsulfamoyl-8-methoxy-2-naphthyl
(305) 5-methoxy-7-N-phenylsulfamoyl-2-naphthyl
(306) 1-(4-methylphenyl)-2-naphthyl
(307) 6,8-di-N-methylsulfamoyl-2-naphthyl
(308) 6-N-2-acetoxyethylsulfamoyl-8-methoxy-2-naphthyl
(309) 5-acetoxy-7-N-phenylsulfamoyl-2-naphthyl
(310) 3-benzoyloxy-2-naphthyl
(311) 5-acetylamino-1-naphthyl
(312) 2-methoxy-1-naphthyl
(313) 4-phenoxy-1-naphthyl
(314) 5-N-methylsulfamoyl-1-naphthyl
(315) 3-N-methylcarbamoyl-4-hydroxy-1-naphthyl
(316) 5-methoxy-6-N-ethylsulfamoyl-1-naphthyl
(317) 7-tetradecyloxy-1-naphthyl
(318) 4-(4-methylphenoxy)-1-naphthyl
(319) 6-N-methylsulfamoyl-1-naphthyl
(320) 3-N,N-dimethylcarbamoyl-4-methoxy-1-naphthyl
(321) 5-methoxy-6-N-benzylsulfamoyl-1-naphthyl
(322) 3,6-di-N-phenylsulfamoyl-1-naphthyl
(323) methyl
(324) ethyl
(325) butyl
(326) octyl
(327) dodecyl
(328) 2-butoxy-2-ethoxyethyl
(329) benzyl
(330) 4-methoxybenzyl
(331) to (333):

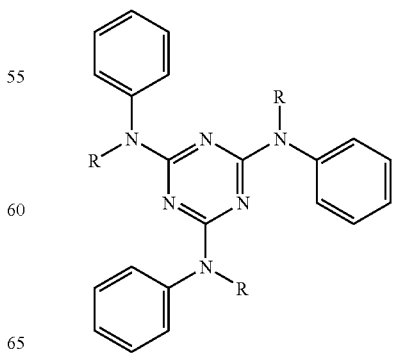

(331) methyl
(332) phenyl
(333) butyl
(446)

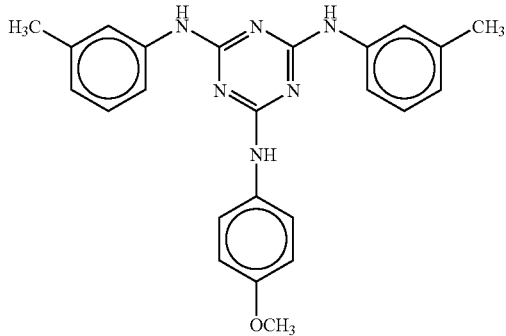

The retardation developer represented by formula (1) is used in an amount of 0.01 to 20 parts by mass, preferably from 0.5 to 10 parts by mass, per 100 parts by mass of the polymer raw material. By using the retardation developer within this range, the retardation of the film can be appropriately controlled. If the amount used is less than 0.01 parts by mass, the increase of retardation is small and the retardation cannot be controlled, whereas if the retardation developer is used in excess of 20 parts by mass, the retardation developer is not compatibilized with the polymer raw material and crystallized in the film.

(Rod-Like Compound)

In the present invention, other than the discotic compound, a rod-like compound having a linear molecular structure can also be preferably used. The term "linear molecular structure" means that the molecular structure of the rod-like compound is linear in a thermodynamically most stable configuration.

In the present invention, the rod-like compound having an absorption maximum on the shorter wavelength side than 250 nm is used as a compound advantageous for forward dispersion of Rth, but on the other hand, by virtue of the properties of the rod-like compound, it is also preferred to use this compound as a retardation developer capable advantageously developing the in-plane retardation Re. In view of the function of the retardation developer, the rod-like compound preferably has at least one aromatic ring, more preferably at least two aromatic rings.

The rod-like compound preferably has a linear molecular structure. The term "linear molecular structure" means that the molecular structure of the rod-like compound is linear in a thermodynamically most stable configuration. The thermodynamically most stable configuration can be determined by crystal structure analysis or molecular orbital calculation. For example, a molecular structure capable of minimizing the heat of formation of the compound can be determined by performing the molecular orbital calculation with use of a software program for molecular orbital calculation (e.g., WinMOPAC2000, produced by Fujitsu Ltd.). The expression "the molecular structure is linear" means that the angle of the molecular structure is 140° or more in a thermodynamically most stable configuration.

The rod-like compound is preferably a compound represented by the following formula (I):

In formula (I), $Ar^1$ and $Ar^2$ each independently represents an aromatic group. In the present invention, the aromatic group includes an aryl group (an aromatic hydrocarbon group), a substituted aryl group, an aromatic heterocyclic group and a substituted aromatic heterocyclic group. An aryl group and a substituted aryl group are more preferred than an aromatic heterocyclic group and a substituted aromatic heterocyclic group. The heterocyclic ring of the aromatic heterocyclic group is generally unsaturated. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom or a sulfur atom. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. The aromatic ring of the aromatic group is preferably a benzene ring, a furan ring, a thiophene ring, a pyrrole ring, an oxazole ring, a thiazole ring, an imidazole ring, a triazole ring, a pyridine ring, a pyrimidine ring or a pyrazine ring, more preferably a benzene ring.

Examples of the substituent of the substituted aryl group and substituted aromatic heterocyclic group include a halogen atom (e.g., F, Cl, Br, I), hydroxyl, carboxyl, cyano, amino, an alkylamino group (e.g., methylamino, ethylamino, butylamino, dimethylamino), nitro, sulfo, carbamoyl, an alkylcarbamoyl group (e.g., N-methylcarbamoyl, N-ethylcarbamoyl, N,N-dimethylcarbamoyl), sulfamoyl, an alkylsulfamoyl group (e.g., N-methylsulfamoyl, N-ethylsulfamoyl, N,N-dimethylsulfamoyl), ureido, an alkylureido group (e.g., N-methylureido, N,N-dimethylureido, N,N,N'-trimethylureido), an alkyl group (e.g., methyl, ethyl, propyl, butyl, pentyl, heptyl, octyl, isopropyl, s-butyl, tert-amyl, cyclohexyl, cyclopentyl), an alkenyl group (e.g., vinyl, allyl, hexenyl), an alkynyl group (e.g., ethynyl, butynyl), an acyl group (e.g., formyl, acetyl, butyryl, hexanoyl, lauryl), an acyloxy group (e.g., acetoxy, butyryloxy, hexanoyloxy, lauryloxy), an alkoxy group (e.g., methoxy, ethoxy, propoxy, butoxy, pentyloxy, heptyloxy, octyloxy), an aryloxy group (e.g., phenoxy), an alkoxycarbonyl group (e.g., methoxycarbonyl, ethoxycarbonyl, propoxycarbonyl, butoxycarbonyl, pentyloxycarbonyl, heptyloxycarbonyl), an aryloxycarbonyl group (e.g., phenoxycarbonyl), an alkoxycarbonylamino group (e.g., butoxycarbonylamino, hexyloxycarbonylamino), an alkylthio group (e.g., methylthio, ethylthio, propylthio, butylthio, pentylthio, heptylthio, octylthio), an arylthio group (e.g., phenylthio), an alkylsulfonyl group (e.g., methylsulfonyl, ethylsulfonyl, propylsulfonyl, butylsulfonyl, pentylsulfonyl, heptylsulfonyl, octylsulfonyl), an amido group (e.g., acetamido, butylamido, hexylamido, laurylamido), and a non-aromatic heterocyclic group (e.g., morpholyl, pyrazinyl).

The substituent of the substituted aryl group and substituted aromatic heterocyclic group is preferably a halogen atom, cyano, carboxyl, hydroxyl, amino, an alkyl-substituted amino group, an acyl group, an acyloxy group, an amide group, an alkoxycarbonyl group, an alkoxy group, an alkylthio group or an alkyl group. The alkyl moiety of the alkylamino group, alkoxycarbonyl group, alkoxy group and alkylthio group and the alkyl group each may further have a substituent. Examples of the substituent of the alkyl moiety and alkyl group include a halogen atom, hydroxyl, carboxyl, cyano, amino, an alkylamino group, nitro, sulfo, carbamoyl, an alkylcarbamoyl group, sulfamoyl, an alkylsulfamoyl group, ureido, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group, and a non-aromatic heterocyclic group. The substituent of the alkyl moiety and alkyl group is preferably a halogen atom, hydroxyl, amino, an alkylamino group, an acyl group, an acyloxy group, an acylamino group, an alkoxycarbonyl group or an alkoxy group.

In formula (1), $L^1$ represents a divalent linking group selected from the group consisting of an alkylene group, an alkenylene group, an alkynylene group, —O—, —CO— and a combination thereof. The alkylene group may have a cyclic structure. The cyclic alkylene group is preferably cyclohexylene, more preferably 1,4-cyclohexylene. As for the chain alkylene group, a linear chain alkylene group is more preferred than a branched alkylene group. The number of carbon atoms in the alkylene group is preferably from 1 to 20, more preferably from 1 to 15, still more preferably from 1 to 10, yet still more preferably from 1 to 8, and most preferably from 1 to 6.

The alkenylene group and alkynylene group each preferably has a chain structure rather than a cyclic structure, more preferably a linear chain structure rather than a branched chain structure. The number of carbon atoms in the alkenylene group and alkynylene group is preferably from 2 to 10, more preferably from 2 to 8, still more preferably from 2 to 6, yet still more preferably from 2 to 4, and most preferably 2 (vinylene or ethynylene).

Examples of the divalent linking group comprising a combination are set forth below.
L-1: —O—CO-alkylene group-CO—O—
L-2: —CO—O-alkylene group-O—CO—
L-3: —O—CO-alkenylene group-CO—O—
L-4: —CO—O-alkenylene group-O—CO—
L-5: —O—CO-alkynylene group-CO—O—
L-6: —CO—O-alkynylene group-O—CO—

In the molecular structure of formula (I), the angle formed by $Ar^1$ and $Ar^2$ across $L^1$ is preferably 140° or more. The rod-like compound is more preferably a compound represented by the following formula (II):

$$Ar^1\text{-}L^2\text{-}X\text{-}L^3\text{-}Ar^2 \quad (II)$$

In formula (II), $Ar^1$ and $Ar^2$ each is independently an aromatic group. The definition and examples of the aromatic group are the same as those for $Ar^1$ and $Ar^2$ in Formula (I).

In formula (II), $L^2$ and $L^3$ each is independently a divalent linking group selected from the group consisting of an alkylene group, —O—, —CO— and a combination thereof. The alkylene group preferably has a chain structure rather than a cyclic structure, more preferably a linear chain structure rather than a branched chain structure. The number of carbon atoms in the alkylene group is preferably from 1 to 10, more preferably from 1 to 8, still more preferably from 1 to 6, yet still more preferably from 1 to 4, and most preferably 1 to 2 (methylene or ethylene). $L^2$ and $L^3$ each is preferably —O—CO— or —CO—O—.

In formula (II), X is 1,4-cyclohexylene, vinylene or ethynylene. Specific examples of the compound represented by formula (I) are set forth below.

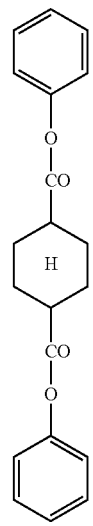

(1)

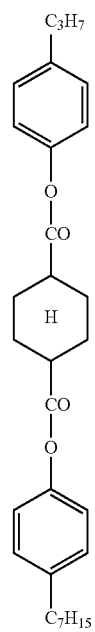

(2)

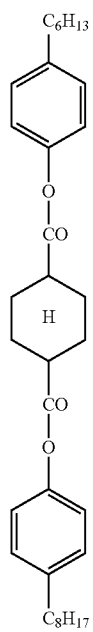
(3)
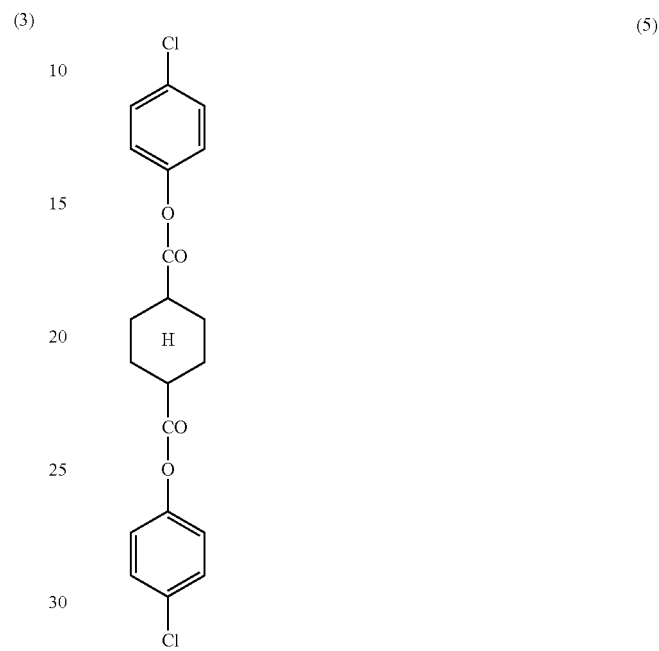
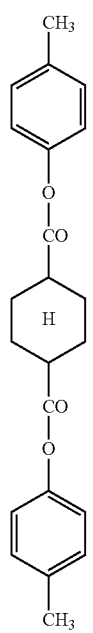
(4)
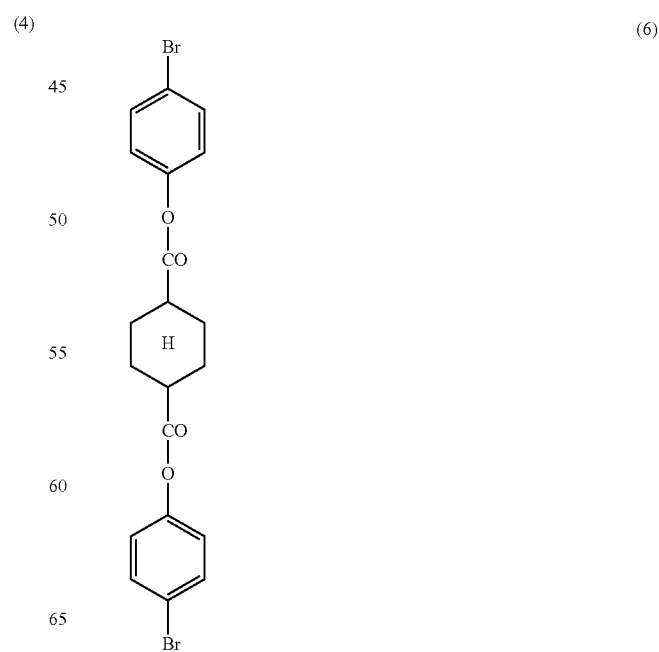

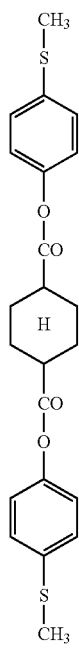
(7)
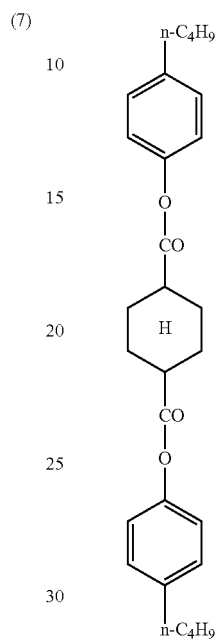
(9)
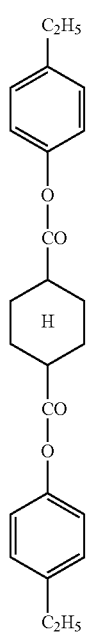
(8)
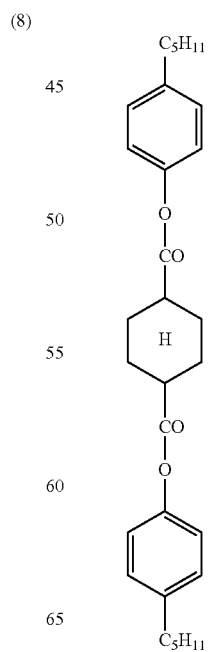
(10)

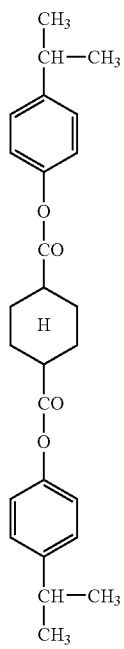
(11)
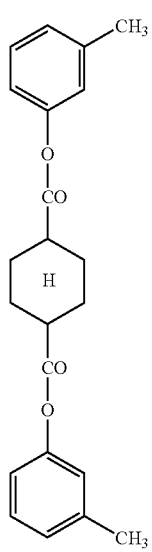
(12)
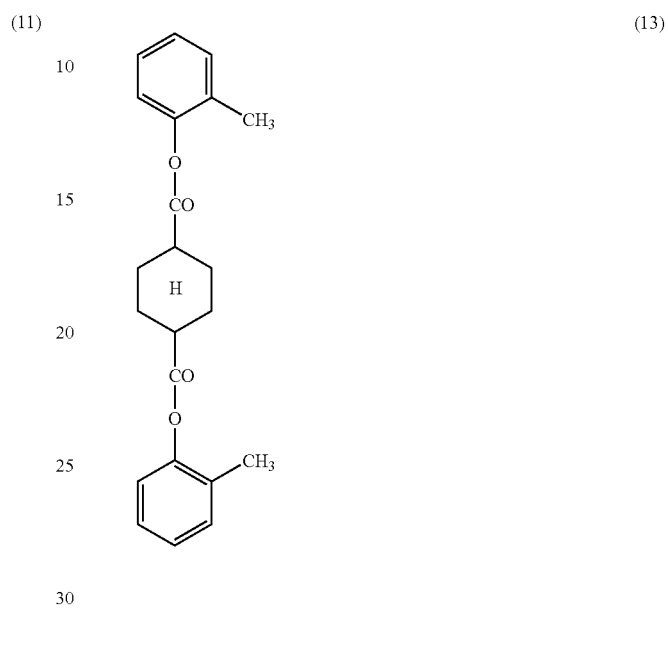
(13)
(14)

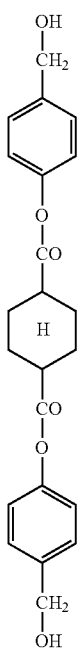
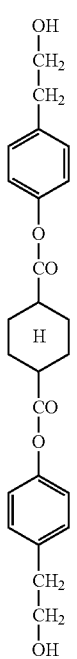
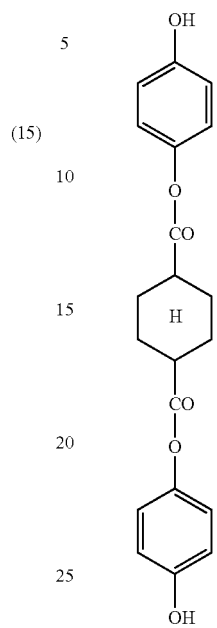
(15)
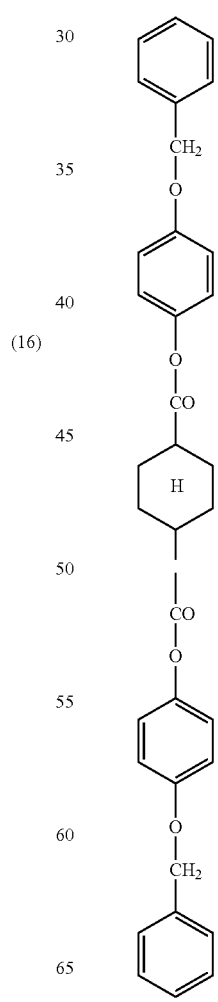
(16)
(17)
(18)

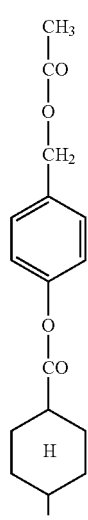
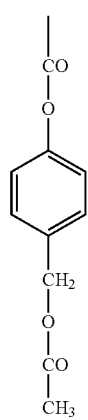
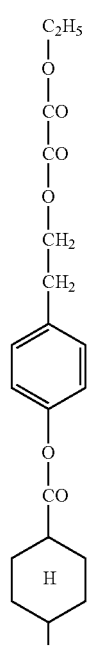
(19)
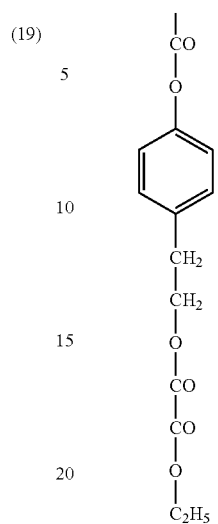
(20)
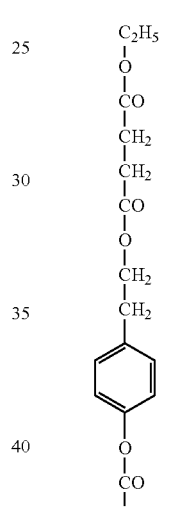
(21)
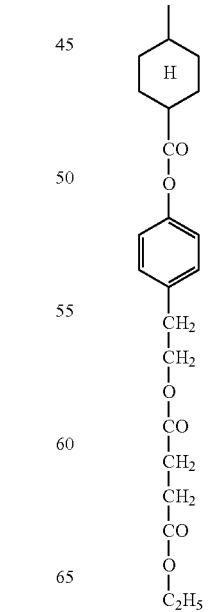

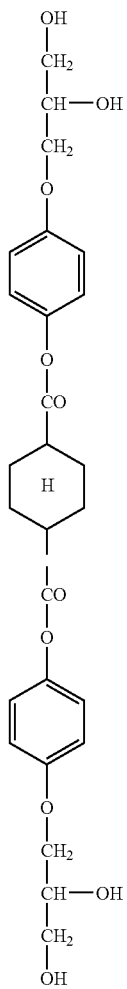
(22)
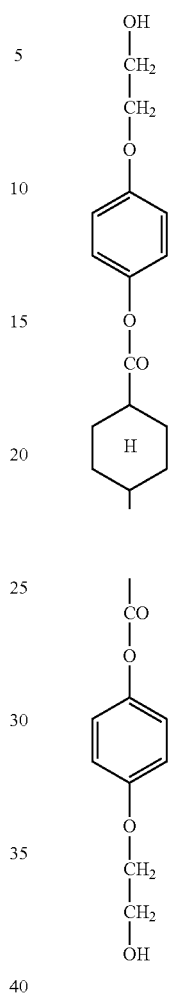
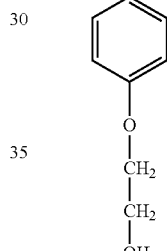
(23)
(24)
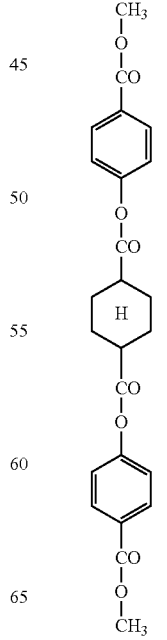
(25)

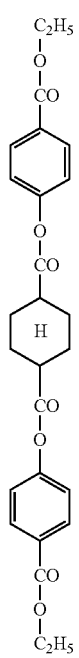
(26)
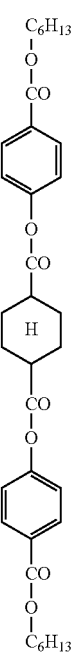
(28)
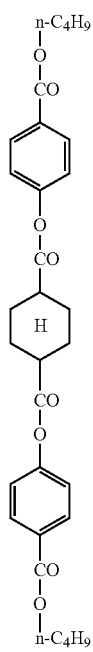
(27)
(29)

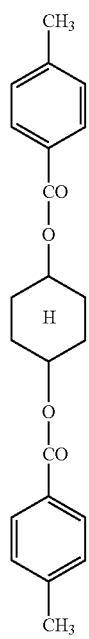
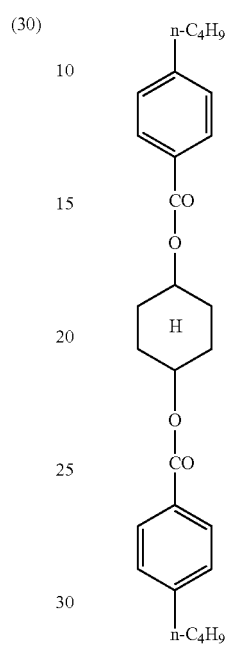
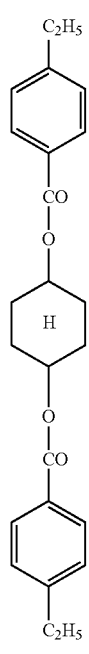
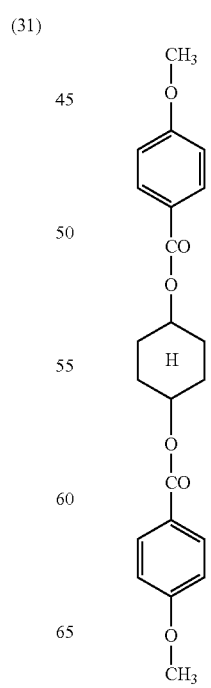

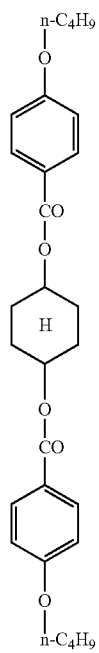
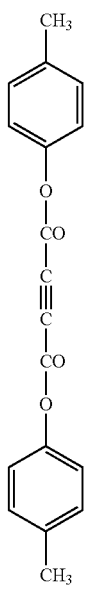
(34)
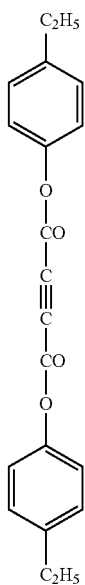
(35)
(36)
(37)

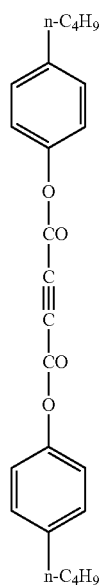
(38)
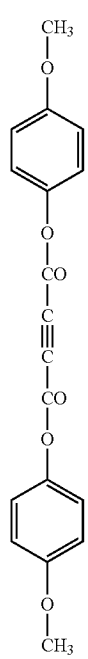
(39)
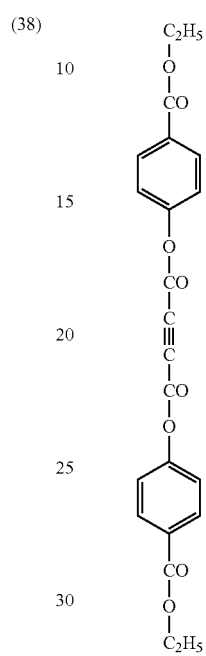
(40)
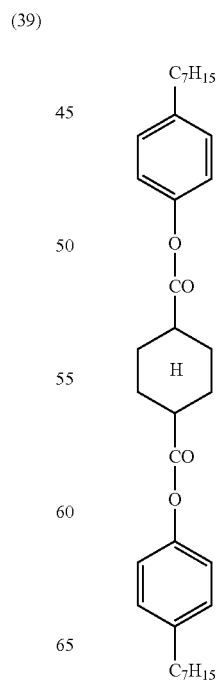
(41)

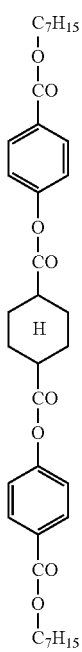
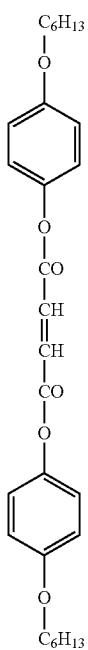
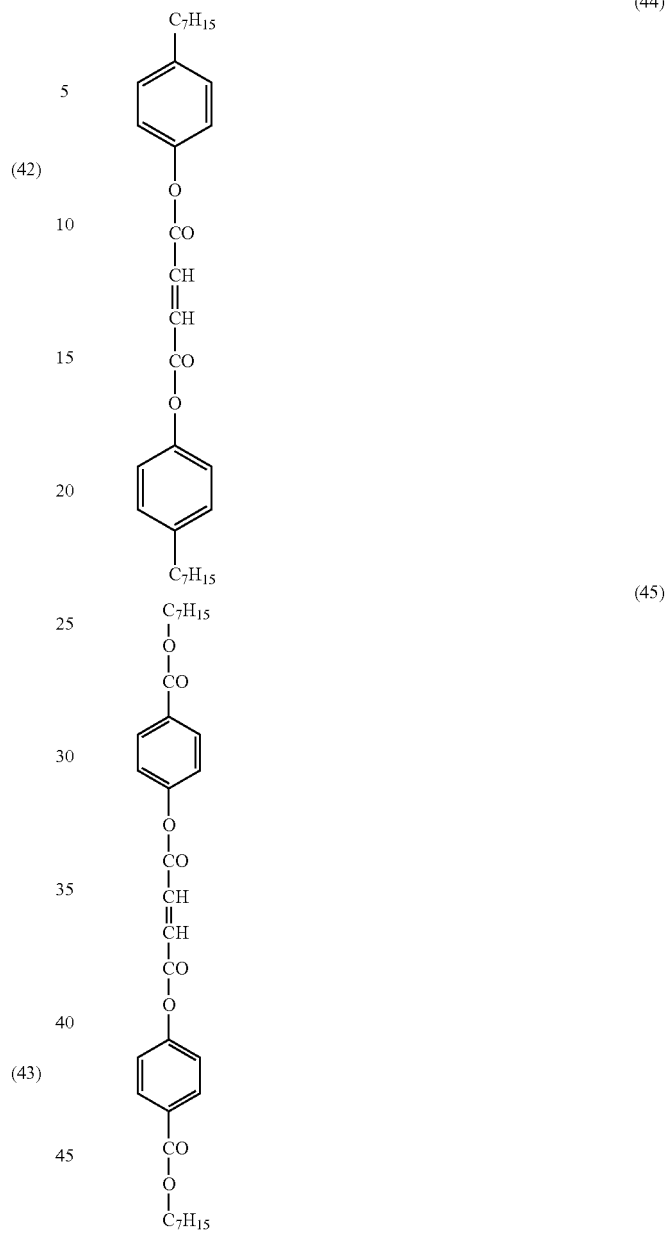

Compounds (1) to (34), (41) and (42) each has two asymmetric carbon atoms at the 1- and 4-positions of the cyclohexane ring. However, since Compounds (1), (4) to (34), (41) and (42) have a symmetrical meso-type molecular structure, these compounds have no optical isomer (optical activity) but only geometric isomers (trans-form and cis-form) are present. The trans-form (1-trans) and cis-form (1-cis) of Compound (1) are shown below.

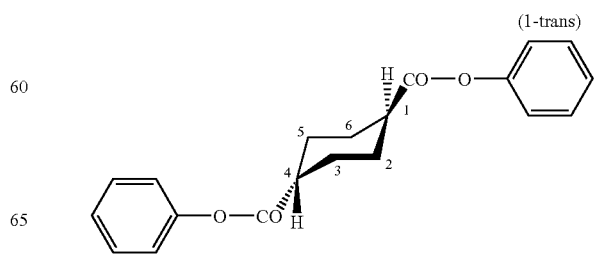

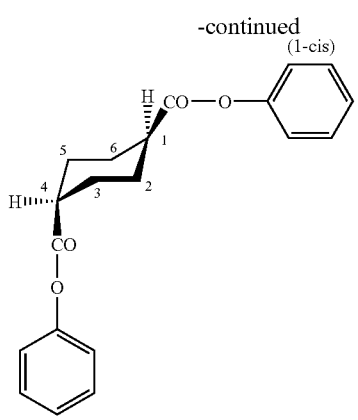

As described above, the rod-like compound preferably has a linear molecular structure and therefore, a trans-form is preferred rather than a cis-form. Compounds (2) and (3) each has optical isomers (four isomers in total) in addition to geometric isomers. As for the geometric isomers, a trans-form is similarly more preferred than a cis-form. The optical isomers have no specific difference in the superiority and may be a D-form, an L-form or a racemic form. In Compounds (43) to (45), the vinylene bond at the center includes a trans-from and a cis-form. From the same reason as above, a trans-form is more preferred than a cis-form.

Other preferred compounds are set forth below.

(46)
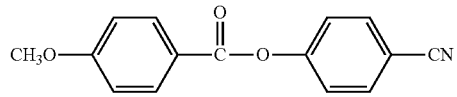

(47)
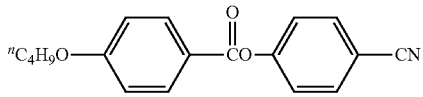

(48)
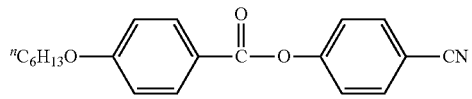

(49)
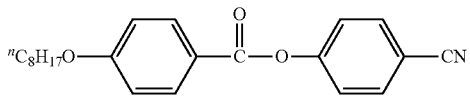

(50)
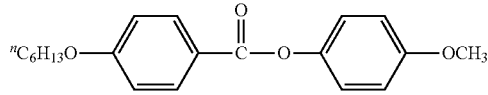

(51)
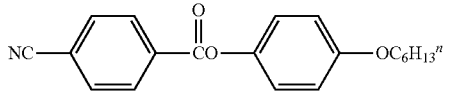

(52)
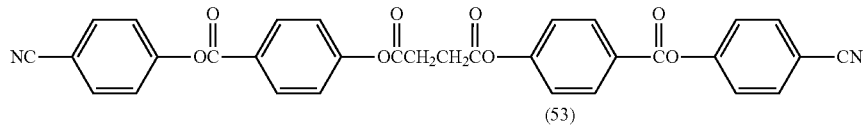

(53)
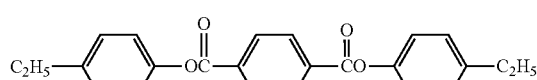

(54)
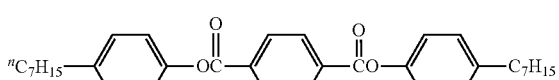

(55)

(56)

(57)
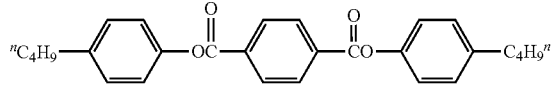

(58)
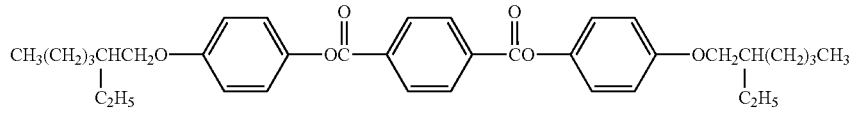

(59)
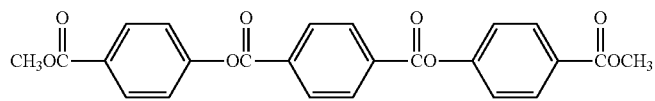

(60)
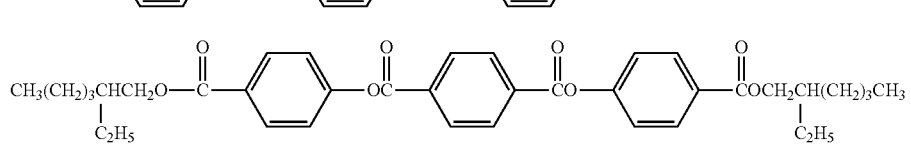

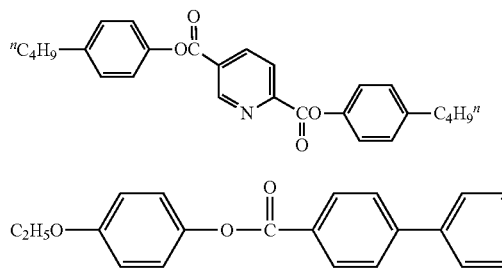

(61)

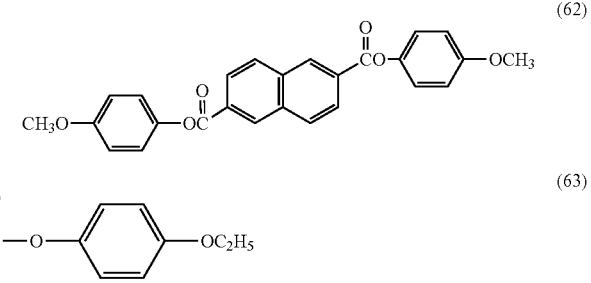

(62)

(63)

Two or more kinds of rod-like compounds of which maximum absorption wavelength (λmax) is shorter than 250 nm in the ultraviolet absorption spectrum of the solution may be used in combination. The rod-like compound can be synthesized by referring to the method described in publications, and the publication includes *Mol. Cryst. Liq. Cryst.*, Vol. 53, page 229 (1979), ibid., Vol. 89, page 93 (1982), ibid., Vol. 145, page 111 (1987), ibid., Vol. 170, page 43 (1989), *J. Am. Chem. Soc.*, Vol. 113, page 1349 (1991), ibid., Vol. 118, page 5346 (1996), ibid., Vol. 92, page 1582 (1970), *J. Org. Chem.*, Vol. 40, page 420 (1975), and *Tetrahedron*, Vol. 48, No. 16, page 3437 (1992).

(Measurement of Spectrum of Specific Compound)

The ultraviolet/visible region (UV-vis) spectrum of the above-described retardation-controlling agent (10-trans) is measured. That is, the retardation-controlling agent (10-trans) is dissolved in tetrahydrofuran (without a stabilizer BHT) to have a concentration of $10^{-5}$ mol/dm³. The thus-prepared solution is measured by a spectrophotometer (manufactured by Hitachi Ltd.), as a result, the wavelength giving an absorption maximum (λmax) is 220 nm and the absorption coefficient (∈) at that wavelength is 15,000. Similarly, in the case of the retardation-controlling agent (29-trans), the wavelength giving an absorption maximum (λmax) is 240 nm and the absorption coefficient (∈) at that wavelength is 20,000. Also, in the case of the retardation-controlling agent (41-trans), the wavelength giving an absorption maximum (λmax) is 230 nm and the absorption coefficient (∈) at that wavelength is 16,000.

Two or more kinds of rod-like compounds of which absorption maximum wavelength (λmax) is shorter than 250 nm in the ultraviolet absorption spectrum of the solution may be used in combination.

(Other Retardation Developers)

A compound other than those described above may be added in the optical film of the present invention without limitation as long as it promotes the in-plane retardation Re and the retardation Rth in a thickness-direction to come close to a desired value and has wavelength-dispersion property such that Re and Rth at each wavelength satisfy formulae (3) to (6).

[Other Additives]

(Fine Particle)

The fine particle which is preferably used in the present invention is described below.

In the present invention, the fine particle is sometimes referred to as a "matting agent". It is effective for improving the sliperriness of the film surface to impart irregularities to the film surface. In this regard, a method of incorporating organic and/or inorganic fine particles to increase the roughness of the film surface and create a so-called matted state, thereby decreasing blocking of films to each other, is known.

In the present invention, the fine particle may be sufficient if it is present in the film. Furthermore, the fine particle may be present on at least one surface of the optical film. By virtue of the presence of a fine particle, the adhesion between the polarizer and the optical film at the processing into a polarizing plate is remarkably enhanced. From this viewpoint, in the present invention, a fine particle is preferably added.

In the case where the optical film is used as a transparent optical film for the application to a polarizing plate protective film, as the level of matting for obtaining a rough surface is lower, increase in the haze can be suppressed and the transparency can be maintained. Therefore, the particle diameter or content of the fine particle is preferably in the following range.

In the case where the matting agent for use in the present invention is an inorganic fine particle, the average diameter of the fine particle in the film is preferably from 0.05 to 3.0 µm, more preferably from 0.05 to 1.0 µm, still more preferably from 0.08 to 0.50 µm, yet still more preferably from 0.10 to 0.30 µm. As for the average particle diameter of the inorganic fine particle in the film, a desired in-film average particle diameter can be selected by the average primary particle diameter of the fine particle and the dispersion treatment described later. In the case where the matting agent for use in the present invention is an inorganic fine particle, the average primary particle diameter of the fine particle is preferably from 0.005 to 0.5 µm, more preferably from 0.01 to 0.2 µm.

A polymer fine particle is preferred because a desired refractive index can be obtained by selecting the polymer species. Furthermore, the polymer fine particle has high compatibility with a cellulose acylate and when a film is formed using the polymer fine particle, the haze, refraction and scattering can be made low. Therefore, when a polymer fine particle is used as the matting agent, a polymer fine particle having a large size is preferably selected rather than using an inorganic fine particle as the matting agent.

In the case of a polymer, the matting agent for use in the present invention preferably is preferably a fine particle having an average particle diameter of 0.1 to 3.0 µm, more preferably from 0.15 to 2.0 µm, still more preferably from 0.2 to 1.0 µm.

The average particle diameter of the matting agent, referred to in the present invention, is an average size in the film (including the matting agent present on the film surface) and irrespective of the matting agent being an aggregate or a non-aggregate, this particle diameter is an average of equivalent-circle diameters of 100 particles obtained by observing the film surface and a section by SEM and/or TEM. The equivalent-circle diameter can be obtained by converting the projected area of a particle obtained by photographing into a circle having the same area and determining the diameter.

The average particle diameter of the matting agent indicates, in the case of an aggregated particle, an average size (average secondary particle diameter) of an aggregate and when the film is produced by a solution casting method, the average particle diameter can be controlled as a particle size in the liquid dispersion by the dispersion operation described later. In the case of a non-aggregated particle, the average particle diameter indicates an average obtained by measuring the size of primary particles.

Irrespective of the kind of the matting agent, for example, spherical, amorphous, inorganic fine particle or polymer, the content of the matting agent is from 0.03 to 1.0 mass %, preferably from 0.05 to 0.6 mass %, more preferably from 0.08 to 0.4 mass %, based on the solid content of the optical film.

The haze of the optical film containing the matting agent for use in the present invention is preferably 4.0% or less, more preferably 2.0% or less, still more preferably 1.0% or less. In order to make small the haze, the fine particle added is thoroughly dispersed to decrease the number of aggregated particles or the fine particle is used only in the skin layer to decrease the amount added. The haze can be measured using a haze meter, Model 1001DP, manufactured by Nippon Denshoku Industries Co., Ltd.

The dispersing method is not particularly limited and an ordinary method can be used. Examples of the media disperser include an attritor, a ball mill, a sand mill and a Dyno mill, and examples of the media-less disperser include an ultrasonic type, a centrifugal type and a high pressure type. In the dispersion operation, such a dispersing device is preferably used but may not be used.

The method for incorporating the matting agent into the film is not particularly limited but includes a method of forming a film by casting a solution containing a polymer and a matting agent, and a method of coating a matting agent liquid dispersion on the produced film. In view of easy controllability of the matting agent distribution on the film surface, the method of coating a matting agent liquid dispersion on the produced film is preferred, and in view of cost, the method of forming a film by casting a solution containing a polymer and a matting agent is preferred. The method of forming a film by casting in the multilayer casting method described later may also be preferably used as a film-forming method capable of controlling the matting agent distribution on the film surface.

In the case of the method of forming a film by casting a solution containing a polymer and a matting agent, the matting agent may be dispersed at the preparation of a polymer solution, or a matting agent liquid dispersion may be added and mixed immediately before casting the polymer solution. For dispersing the matting agent in a polymer solution, a surfactant or a polymer may be added as the dispersion aid in a small amount. Other than these methods, a matting agent may be provided after the film formation. In this case, the matting agent layer is preferably formed using a binder. The binder for the layer containing the matting agent of the present invention is not particularly limited and may be a lipophilic binder or a hydrophilic binder. As for the lipophilic binder, a known thermoplastic resin, thermosetting resin, radiation-curable resin or reaction-type resin or a mixture thereof may be used. The Tg of the resin is preferably from 80 to 400° C., more preferably from 120 to 350° C., and the weight average molecular weight of the resin is preferably from 10,000 to 1,000,000, more preferably from 10,000 to 500,000.

Examples of the thermoplastic resin include a vinyl-based copolymer such as a vinyl chloride.vinyl acetate copolymer, a copolymer of vinyl chloride, vinyl acetate and vinyl alcohol, maleic acid and/or acrylic acid, a vinyl chloride.vinylidene chloride copolymer, a vinyl chloride.acrylonitrile copolymer and an ethylene.vinyl acetate copolymer; a cellulose derivative such as nitrocellulose, cellulose acetate propionate and cellulose acetate butyrate resin; a rubber-based resin such as cyclic polyolefin resin, acrylic resin, polyvinyl acetal resin, polyvinyl butyral resin, polyester polyurethane resin, polyether polyurethane, polycarbonate polyurethane resin, polyester resin, polyether resin, polyamide resin, amino resin, styrene butadiene resin and butadiene acrylonitrile resin; a silicone-based resin; and a fluororesin.

In the case of incorporating the matting agent into the optical film by coating, a conventionally known coating method [for example, a die coater (extrusion coater, slide coater), a roll coater (forward roll coater, reverse roll coater, gravure coater), a rod coater or a blade coater] can be preferably used. In order to perform the coating without allowing, for example, deformation of the film as the coating support or degradation of the coating solution, the coating is preferably performed at a temperature of 10 to 100° C., more preferably from 20 to 80° C. The coating speed is appropriately adjusted depending on the viscosity of coating solution or the coating temperature but is preferably from 10 to 100 m/min, more preferably from 20 to 80 m/min.

The coating layer containing the matting agent can be formed by dissolving the matting agent in an appropriate organic solvent, coating the obtained coating solution on a film containing a polymer such as cellulose acylate, and drying the coating. The matting agent may also be added in the form of a dispersion in the coating solution. The solvent used is preferably water, a chlorine-based solvent (e.g., methylene chloride, chloroform), alcohols (e.g., methanol, ethanol, isopropanol), ketones (e.g., acetone, methyl ethyl ketone, cyclohexanone), esters (e.g., methyl, ethyl, propyl or butyl ester of acetic acid, formic acid, oxalic acid, maleic acid and succinic acid), an aromatic hydrocarbon type (e.g., benzene, toluene, xylene) or an amide type (e.g., dimethylformamide, dimethylacetamide, n-methylpyrrolidone).

In both the method of forming a film by casting a solution containing a polymer and a matting agent and the method of coating a matting agent liquid dispersion on the produced film, the average particle diameter of the matting agent fine particle contained in the produced optical film can be controlled by varying the conventionally known dispersion conditions such as, in the case of an aggregated matting agent, the average primary particle diameter of matting agent fine particle, the amount added of matting agent fine particle, the kind of solvent for dispersion therein, the amount added of solvent for dispersion therein, the dispersing method, the kind of disperser, the size of disperser, the dispersing time, the energy per unit time applied to liquid dispersion by disperser, the mixing method, the kind of binder, the amount added of binder, the order of addition and the amount of liquid dispersion charged.

Also in the case of using a non-aggregated matting agent, unexpected aggregation is preferably prevented by controlling the above-described dispersion conditions similarly to the aggregated matting agent.

The dynamic friction coefficient of the optical film having added thereto the fine particle is 0.8 or less, preferably 0.5 or less. The dynamic friction coefficient is preferably 0.8 or less from the standpoint that stretch or winding wrinkle is less caused at the take-up during film formation and processing of the optical film, the wound shape is not impaired, an uneven tension due to stretch or wrinkle is not applied to the optical film, and unintended non-uniform optical properties can be prevented from appearing on the film surface. The dynamic friction coefficient can be measured using a steel ball according to the method specified in JIS or ASTM.

In the composition of the fine particle used, an inorganic compound or a polymer compound is used, but the compound is not particularly limited and two or more kinds of these fine particles may be mixed and used. Examples of the inorganic compound include a silicon-containing compound, silicon dioxide, silicone, barium sulfate, colloidal manganese, barium strontium sulfate, titanium oxide, zinc oxide, aluminum oxide, barium oxide, zirconium oxide, strontium oxide, antimony oxide, tin oxide, tin oxide.antimony, calcium carbonate, talc, calcined kaolin, calcined calcium silicate, hydrated calcium silicate, aluminum silicate, magnesium silicate and calcium phosphate. Other examples include silicon dioxide such as synthetic silica produced by wet process or gelation of silicic acid, and titanium dioxide (anatase or rutile) produced from titanium slag and sulfuric acid. The fine particle may also be obtained by crashing an inorganic material having a relatively large particle diameter, for example, 20 μm or more, and performing classification (e.g., vibration filtering, wind classification). Among those inorganic compounds, a silicon-containing compound and zirconium oxide are preferred as the fine particle added to the optical film of the present invention, and a silicon-containing compound is more preferred because the turbidity is low and the haze of the film can be decreased. As for the silicon dioxide particle, many commercial products are available in the form of the surface being treated with an organic material, and these are particularly preferred because the surface haze of the film can be decreased. Preferred examples of the organic material used for the surface treatment of the silicon dioxide fine particle include halosilanes, alkoxysilanes, silazane and siloxane. The silicone fine particle is preferably a silicone fine particle having a three-dimensional network, and those bonded with an alkyl group such as methyl group by the surface treatment are more preferred.

Examples of the silicon dioxide fine particle which can be used include commercial products available under trade names of Aerosil R972, R974, R812, 200, 300, R202, OX50 and TT600 (all produced by Nihon Aerosil Co., Ltd.); and Excelica SE-5, SE-8, SE-15, SE-5V, SE-8V, SE-15K, UF-320, UF-310 and UF-305 (all produced by Tokuyama Corp.)

Examples of the silicone which can be used include commercial products available under trade names of XC99-A8808, Tospearl 120, 130, 145 and 2000B (all produced by GE Toshiba Silicone Co., Ltd.).

Examples of the polymer compound (polymer fine particle) include a fluororesin such as polytetrafluoroethylene and tetrafluoroethylene-perfluoroalkyl vinyl copolymer, cellulose acetate, polystyrene, polypropylene, polymethyl methacrylate, polypropyl methacrylate, polymethyl acrylate, polyethylene carbonate, polyamide, chlorinated polyether and starch. Also, a pulverized and classified product thereof may be used. Furthermore, a polymer compound synthesized by suspension polymerization, a polymer particle made spherical by a spray drying method, a dispersion method or the like, and an inorganic compound may be used.

In addition, a polymer compound which is a polymer of one of the following monomer compounds or two or more thereof and which is formed into a particle by various means may also be used. Specific examples of the monomer compound of the polymer compound include an acrylic acid ester, a methacrylic acid ester, an itaconic acid diester, a crotonic acid ester, a maleic acid diester and phthalic acid diesters, and examples of the ester residue include methyl, ethyl, propyl, isopropyl, butyl, hexyl, 2-ethylhexyl, 2-chloroethyl, cyanoethyl, 2-acetoxyethyl, dimethylaminoethyl, benzyl, cyclohexyl, furfuryl, phenyl, 2-hydroxyethyl, 2-ethoxyethyl, glycidyl and ω-methoxy-polyethylene glycol (addition molar number: 9).

Examples of the vinyl esters include vinyl acetate, vinyl propionate, vinyl butyrate, vinyl isobutyrate, vinyl caproate, vinyl chloroacetate, vinyl benzoate and vinyl salicylate. Examples of the olefins include dicyclopentadiene, ethylene, propylene, 1-butene, 1-pentene, vinyl chloride, vinylidene chloride, isoprene, chloroprene, butadiene and 2,3-dimethylbutadiene.

Examples of the styrenes include styrene, methylstyrene, dimethylstyrene, trimethylstyrene, ethyl styrene, isopropylstyrene, chloromethylstyrene, methoxystyrene, acetoxystyrene, chlorostyrene, dichlorostyrene, bromostyrene, trifluoromethylstyrene and methyl vinylbenzoate.

Examples of the acrylamides include acrylamide, methylacrylamide, ethylacrylamide, propylacrylamide, butylacrylamide, tert-butylacrylamide, phenylacrylamide and dimethylacrylamide; examples of the methacrylamides include methacrylamide, methylmethacrylamide, ethylmethacrylamide, propylmethacrylamide and tert-butylmethacrylamide; examples of the allyl compound include allyl acetate, allyl caproate, allyl laurate and allyl benzoate; examples of the vinyl ethers include methyl vinyl ether, butyl vinyl ether, hexyl vinyl ether, methoxyethyl vinyl ether and dimethylaminoethyl vinyl ether; examples of the vinyl ketones include methyl vinyl ketone, phenyl vinyl ketone and methoxyethyl vinyl ketone; examples of the vinyl heterocyclic compound include vinylpyridine, N-vinylimidazole, N-vinyloxazolidone, N-vinyltriazole and N-vinylpyrrolidone; examples of the unsaturated nitrites include acrylonitrile and methacrylonitrile; and examples of the polyfunctional monomer include divinylbenzene, methylenebisacrylamide and ethylene glycol dimethacrylate.

Other examples include an acrylic acid, a methacrylic acid, an itaconic acid, maleic acid, a monoalkyl itaconate (e.g., monoethyl itaconate); a monoalkyl maleate (e.g., monomethyl maleate); a styrenesulfonic acid, vinylbenzylsulfonic acid, a vinylsulfonic acid, an acryloyloxyalkylsulfonic acid (e.g., acryloyloxymethylsulfonic acid); a methacryloyloxyalkylsulfonic acid (e.g., methacryloyloxyethylsulfonic acid); an acrylamidoalkylsulfonic acid (e.g., 2-acrylamido-2-methylethanesulfonic acid); a methacrylamidoalkylsulfonic acid (e.g., 2-methacrylamido-2-methylethanesulfonic acid); and an acryloyloxyalkyl phosphate (e.g., acryloyloxyethyl phosphate). These acid may be in the form of a salt with an alkali metal (e.g., Na, K) or an ammonium ion. As for other monomer compounds, the crosslinking monomers described in U.S. Pat. Nos. 3,459,790, 3,438,708, 3,554,987, 4,215,195 and 4,247,673, and JP-A-57-205735 can be used and are preferred. Specific examples of such a crosslinking monomer include N-(2-acetoacetoxyethyl)acrylamide and N-(2-(2-acetoacetoxyethoxy)ethyl)acrylamide.

The polymer fine particle may be a polymer particle obtained by polymerizing one of these monomer compounds alone or a copolymer particle obtained by polymerizing a plurality of monomers in combination. Among those monomer compounds, acrylic acid esters, methacrylic acid esters, vinyl esters, styrenes and olefins are preferred. Also, a particle containing a fluorine atom or a silicon atom described in JP-A-62-14647, JP-A-62-17744 and JP-A-62-17743 may be used in the present invention.

As regards these polymer compounds, preferred examples of the particle composition include polystyrene, polymethyl (meth)acrylate, polyethyl acrylate, poly(methyl methacrylate/methacrylic acid=95/5 (by mol)), poly(styrene/styrenesulfonic acid=95/5 (by mol)), polyacrylonitrile and poly(m-ethyl methacrylate/ethyl acrylate/methacrylic acid=50/40/10).

Also, a reactive (particularly gelatin) group-containing particle described in JP-A-64-77052 and European Patent 307,855 may be used as the fine particle of the present invention. Furthermore, a group dissolvable under an alkaline or acidic condition may be contained in a large amount.

Out of those polymer compounds, preferred as the fine particle added to the optical film of the present invention are a fluororesin such as polytetrafluoroethylene and tetrafluoro-ethylene-perfluoroalkyl vinyl copolymer, a polyamide, a polypropylene and a chlorinated polyether.

Examples of the polytetrafluoroethylene which can be used include commercial products available under trade names of Lubron L-2, L-5 and L-5F (all produced by Daikin Industries, Ltd.). Examples of the polyamide which can be used include commercial products available under trade names of SP-500 (produced by Toray Industries, Inc.)

The fine particle for use in the present invention is preferably, as the inorganic compound, silicon dioxide, silicone or titanium dioxide, and as the polymer compound, a fluororesin such as polytetrafluoroethylene, a polyamide, a polypropylene or a chlorinated polyether, more preferably silicon dioxide, silicone or a fluororesin such as polytetrafluoroethylene, still more preferably silicon dioxide surface-treated with an organic material, or silicone.

In the present invention, when a fine particle liquid dispersion is used at the addition of the fine particle, the fine particle liquid dispersion is preferably filtered. The liquid dispersion after filtration is preferably transferred by piping not through a liquid feed pump without staying in a stock tank or the like and mixed in an in-line mixer with the cellulose acylate solution separately transferred by piping, whereby staying of both solutions or formation of a new aggregate due to a liquid feed pump can be advantageously prevented. The filtration is preferably performed in a filtering machine disposed immediately before the in-line mixer. Examples of the filter material of the filtering machine include a particle-packed layer, a metal mesh (particularly, folded mesh), woven fabric, filter paper and porous plate (including micropore). The filter material is not particularly limited as long as it can be used for a long time with fixed absolute filtration precision, but in view of solvent resistance and durability, a metal material is preferred, and a stainless steel material is more preferred. In view of clogging, the absolute filtration precision is preferably from 10 to 100 μm, more preferably from 30 to 60 μm. Within this range, the filter material can be used for a long time with fixed absolute filtration precision.

(Deterioration Inhibitor)

In the optical film of the present invention preferably, a known deterioration (oxidation) inhibitor, for example, a phenol-based or hydroquinone-based antioxidant such as 2,6-di-tert-butyl, 4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone, pentaerythrityl-tetrakis[3-(3,5-di-tert-butyl-4-hydroxyphenyl)propionate, may be added. Furthermore, a phosphorus-based antioxidant such as tris(4-methoxy-3,5-diphenyl) phosphite, tris(nonylphenyl) phosphite, tris(2,4-di-tert-butylphenyl) phosphite, bis(2,6-di-tert-butyl-4-methylphenyl)pentaerythritol diphosphite and bis(2,4-di-tert-butylphenyl)pentaerythritol diphosphite is preferably added.

The amount of the antioxidant added is preferably from 0.05 to 5.0 parts by mass per 100 parts by mass of the cellulose acylate.

(Ultraviolet Absorbent)

In the optical film of the present invention, an ultraviolet absorbent is preferably used in view of preventing deterioration of a polarizing plate, a liquid crystal and the like. An ultraviolet absorbent has less absorption of visible light at a wavelength of 400 nm or more is preferably used because of its excellent ability of absorbing ultraviolet light at a wavelength of 370 nm or less and giving good liquid crystal display property. Specific examples of the ultraviolet absorbent preferably used in the present invention include a hindered phenol-based compound, an oxybenzophenone-based compound, a benzotriazole-based compound, a salicylic acid ester-based compound, a benzophenone-based compound, a cyanoacrylate-based compound and nickel complex salt-based compound. Examples of the hindered phenol-based compound include 2,6-di-tert-butyl-p-cresol, pentaerythrityl-tetrakis[3-(3,5-di-tert-butyl-4-hydroxyphenyl)propionate], N,N'-hexamethylene bis(3,5-di-tert-butyl-4-hydroxy-hydrocinnamide), 1,3,5-trimethyl-2,4,6-tris(3,5-di-tert-butyl-4-hydroxybenzyl)benzene and tris-(3,5-di-tert-butyl-4-hydroxybenzyl)-isocyanurate. Examples of the benzotriazole-based compound include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol bis[3-(3-tert-butyl-5-methyl-4-hydroxyphenyl)-propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2(2'-hydroxy-3',5'-di-tert-butylphenol)-5-chlorobenzotriazole, 2(2'-hydroxy-3',5'-di-tert-amylphenyl)-5-chlorobenzotriazole, 2,6-di-tert-butyl-p-cresol and pentaerythrityl-tetrakis[3-(3,5-di-tert-butyl-4-hydroxyphenyl)propionate]. The amount of the ultraviolet inhibitor added is preferably from 0.0001 to 1.0 part by mass, more preferably from 0.001 to 0.1 part by mass, per 100 parts by mass of the cellulose acylate.

(Release Accelerator)

As for the additive capable of decreasing the release resistance of the optical film, many surfactants are found to have a remarkable effect. The preferred effective releasing agent includes a phosphoric acid ester-based surfactant, a carboxylic acid or carboxylate-based surfactant, a sulfonic acid or sulfonate-based surfactant and a sulfuric acid ester-based surfactant. Also, a fluorine-containing surfactant obtained by replacing a part of the hydrogen atom bonded to the hydrocarbon chain of the above-described surfactant by a fluorine atom is effective. Examples of the releasing agent are set forth below.

RZ-1 $C_8H_{17}O-P(=O)-(OH)_2$
RZ-2 $C_{12}H_{25}O-P(=O)-(OK)_2$
RZ-3 $C_{12}H_{25}OCH_2CH_2O-P(=O)-(OK)_2$
RZ-4 $C_{15}H_{31}(OCH_2CH_2O)_5O-P(=O)-(OK)_2$
RZ-5 $\{C_{12}H_{25}O(CH_2CH_2O)_5\}_2-P(=O)-OH$
RZ-6 $\{C_{18}H_{35}(OCH_2CH_2)_8O\}_2-P(=O)-ONH_4$
RZ-7 $(t-C_4H_9)_3-C_6H_2-OCH_2CH_2O-P(=O)-(OK)_2$
RZ-8 $(iso-C_9H_{19}-C_6H_4-O-(CH_2CH_2O)_5-P(=O)-(OK)(OH)$
RZ-9 $C_{12}H_{25}SO_3Na$
RZ-10 $C_{12}H_{25}OS_3ONa$
RZ-11 $C_{17}H_{33}COOH$
RZ-12 $C_{17}H_{33}COOH.N(CH_2CH_2OH)_3$
RZ-13 $iso-C_8H_{17}-C_6H_4-O-(CH_2CH_2O)_3-(CH_2)_2SO_3Na$
RZ-14 $(iso-C_9H_{19})_2-C_6H_3-O-(CH_2CH_2O)_3-(CH_2)_4SO_3Na$
RZ-15 sodium triisopropylnaphthalenesulufonate
RZ-16 sodium tert-butylnaphthalenesulufonate RZ-17 $C_{17}H_{33}CON(CH_3)CH_2CH_2SO_3Na$
RZ-18 $C_{12}H_{25}$—$C_6H_4SO_3.NH_4$ The amount of the releasing agent added is preferably from 0.05 to 5 parts by mass, more preferably from 0.1 to 2 parts by mass, and most preferably from 0.1 to 0.5 parts by mass, per 100 parts by mass of the cellulose acylate.

The optical film of the present invention may further contain an ultraviolet absorbent such as phenylsalycylic acid, 2-hydroxybenzophenone and triphenyl phosphate, a bluing agent for changing tint, an antioxidant and the like.

Also for the purpose of enhancing the stretching property at the film stretching described later, the optical film of the present invention may contain a known plasticizer such as phthalic acid ester (e.g., dimethyl phthalate, diethyl phthalate, dibutyl phthalate), phosphoric acid ester (e.g., tributyl phosphate), aliphatic dibasic ester, glycerin derivative and glycol derivative.

[Film-Forming Method]

At the production of the optical film of the present invention, the production method is not particularly limited as long as an optical film satisfying formulae (1) to (6) can be obtained, and the film is preferably produced by the production method of an optical film of the present invention, comprising a stretching step, a shrinking step, and a step of increasing the film thickness, which is described later. As regards the preparation method of materials before stretching step, the method for shaping the polymer raw material into a film, the drying method, the take-up method and the like, those employed in known film-forming methods may be used. Melt film formation may be performed by heating raw materials or may be performed by dissolving raw materials in a solvent.

[Melt Film Formation]

The optical film of the present invention may be produced by melt film formation. The film may be produced by injection molding of heat-melting raw materials such as raw material polymer and additives, and extruding the melt into a film, or may be produced by sandwiching the raw material between two heated plates and pressing it into a film.

The heat-melting temperature is not particularly limited in both cases as long as it is a temperature at which the raw material polymer uniformly melts. Specifically, the heating temperature is not less than the melting point or softening point. In order to obtain a uniform film, the melting is performed under heating at a temperature higher than the melting point of the polymer raw material, preferably at a temperature from 5 to 40° C. higher than the melting point, more preferably from 8 to 30° C. higher than the melting point.

[Solution Film Formation]

The optical film of the present invention is also preferably produced by solution film formation of dissolving the polymer raw material, additives and the like in a solvent. Particularly, in view of enhancing the surface state of the film, the solution film formation is an excellent film formation method. The specific means of solution film formation is not particularly limited as long as it is a method of casting a solution on a support substrate having surface smoothness, such as metal plate. The film may be produced by spreading a dope solution directly on a support substrate or may be produced by an appropriate method such as casting method using Giesser or various coating methods using a blade. The solvent may be dried at room temperature or by heat-drying according to the boiling point of the solvent used. The heat-drying may be performed at a temperature of 30 to 200° C. for approximately from 5 minutes to 2 hours in a stationary manner or with air blowing according to the predetermined dry state.

In the case of producing the optical film of the present invention by solution film formation, the film can be produced using a solution (dope) prepared by uniformly dissolving the polymer raw material, additives and the like in an organic solvent. The organic solvent preferably used as a main solvent of the optical film of the present invention is preferably a solvent selected from an ether having a carbon number of 3 to 12, a ketone, an ester, and a halogenated hydrocarbon having a carbon number of 1 to 7. The ester, ketone and ether each may have a cyclic structure. A compound having any two or more functional groups of the ester, ketone and ether (that is, —O—, —CO— and —COO—) may also be used as a main solvent. The main solvent may have another functional group such as alcoholic hydroxyl group. In the case of a main solvent having two or more kinds of functional groups, the number of carbon atoms thereof may be sufficient if it is within the range specified for the compound having any one of the functional groups.

[Dissolution Step]

The preparation of the solution (dope) for the optical film of the present invention is not particularly limited in the dissolution method, and a dissolution method at room temperature, a cooling dissolution method, a high-temperature dissolution method or a combination thereof may be employed. The preparation of optical film solution and the steps involved in the dissolution step, such as concentration and filtration of the solution, may be performed according to known dissolution methods for the production of a film.

[Casting Step and Separation Step]

The film production method of producing the optical film of the present invention by solution film formation is described below. As regards the method and equipment for producing the optical film of the present invention, the solution casting film-formation method and the solution casting film-formation apparatus conventionally used for the production of a cellulose acetate film are preferably used.

In the casting step, the dope (a solution after adding the polymer raw material, additives and the like) prepared is transferred from a dissolving machine (kettle) to a stock kettle and once stored therein to remove the bubbles contained in the dope, thereby finally preparing the dope. The thus-prepared dope is delivered to a pressure-type die from the dope discharge port through a pressure-type quantitative gear pump capable of feeding a liquid in a constant amount with high accuracy, for example, by the rotation number, and the dope is uniformly cast from an open mouth (slit) of the pressure-type die on an endlessly running metal support in the casting part.

In the separation step, the half-dry dope film (also called web) is separated from the metal support at the release point where the metal support after casting reaches by making a nearly full circle.

[Drying Step, Take-Up Step]

In the drying step, the obtained web is dried by conveying it by a tenter while nipping both edges with clips and thereby keeping the width, and further dried.

In the take-up step, the web is subsequently conveyed by a group of rolls of a drying device to complete the drying and taken up into a predetermined length by a take-up machine. The combination of the tenter and the drying device comprising a group of rolls varies depending on the purpose.

[Residual Solvent Amount of Film]

In the case of obtaining the optical film of the present invention by solution film formation, the drying is preferably performed under such conditions as that the final residual solvent amount becomes from 0.01 to 1.5 mass %, more preferably from 0.01 to 1.0 mass %. Incidentally, the residual solvent amount can be expressed by the following formula.

Residual solvent amount (mass %)=$\{(M-N)/N\} \times 100$ wherein M is the mass of web at an arbitrary point, and N is the mass when the web having M is dried at 110° C. for 3 hours.

The production method of an optical film of the present invention is described in detail below.

[Production Method of Optical Film]

The production method of an optical film of the present invention needs to comprise a stretching step of stretching either the longitudinal direction or the width direction of a film, a shrinking step of shrinking the other direction, and increase the film thickness as compared with the film thickness before at least one of the stretching step and the shrinking step.

[Stretching Step, Shrinking Step]

In the production method of an optical film of the present invention, at the time of performing the stretching step and the shrinking step, the film thickness needs to be increased by taking a balance between the stretching direction and the shrinking direction.

The stretching and shrinking may be performed by a known method such as zone method, roll method and tenter method, or may be performed by a inter-clip stretching method. The inter-clip stretching method is a method of fixing both edges of a rectangular film with a fixing member such as clip to prevent slipping, and stretching the film. A roll stretching method is also preferred. The roll stretching may be either single-step stretching or multi-step stretching and may be parallel arrangement or cross arrangement. The roll is not particularly limited, but a jacket roll and an expander roll are preferably used.

As for the method of increasing the film thickness, the film thickness is preferably increased by shrinking the film under heating. Meanwhile, the increase of the film is accompanied with the shrinking step of the film. The shrinking step of the production method of the invention includes both shrinkage by increase of the film thickness and shrinkage accompanied with stretching the film. Also, as a film produced by the production method of the invention, a cellulose acylate film is preferable.

As for the heating method when the film thickness is increased by heating, a method of applying a heated air to the film at the stretching or shrinking or in a stretching or shrinking zone is preferred.

The heat treatment temperature is not particularly limited and is selected in accordance to kind of the resin of film used or desired shrinkage ratio. If a cellulose acylate film is used as the film, for example, 160 to 200° C. is preferable, 165 to 195 is more preferable, and 170 to 190 is still more preferable.

The heat treatment time is also not particularly limited and is selected in accordance to kind of the resin of film used, desired shrinkage ratio or the heat treatment temperature. If the heat treatment temperature is within the above scope, 5 to 60 seconds is preferable, 10 to 50 seconds is more preferable, and 15 to 45 seconds is still more preferable.

The heating may be performed before the stretch (and/or shrinkage accompanied with the stretch), may be performed at the same time with the stretch (and/or shrinkage accompanied with the stretch), or may be separately preformed after the stretch (and/or shrinkage accompanied with the stretch). Hereinafter, the shrinkage of film by heating is occasionally referred to as a "step of increasing the film thickness."

In the production method of an optical film of the present invention, the pulling method at the time of stretching or shrinking the optical film is not particularly limited as described above, but in order to attain desired Re and Rth optical performances and make ideal the wavelength dependency thereof, the following method may be appropriately used.

(Shrinking in Longitudinal Direction/Width Stretching)

That is, the method preferably comprises a shrinking step of conveying the optical film while gripping it with tenter clips and narrowing the distance between the tenter clips in the conveying direction, thereby shrinking the film, and a stretching step of stretching the optical film in the direction nearly orthogonal to the conveying direction. At this time, in stretching a continuous lengthy film, the film is preferably shrunk in the longitudinal direction and stretched in the width direction by using a tenter having such a construction as that the distance between tenter clips in the longitudinal direction becomes narrow while the film is gripped and conveyed.

(Stretching in Longitudinal Direction/Width Shrinking)

Also, the method preferably comprises a stretching step of conveying the film while gripping it with tenter clips and broadening the distance between said tenter clips in the conveying direction, thereby stretching the film, and a step of shrinking the film in the direction nearly orthogonal to the conveying direction. At this time, in stretching a continuous lengthy film, the film is preferably stretched in the longitudinal direction and shrunk in the width direction by using a tenter having such a construction as that the distance between tenter clips in the longitudinal direction becomes broad while the film is gripped and conveyed.

In the production method of an optical film of the present invention, the stretching operation may be combined with a heating step of heating the film at a temperature near the glass transition temperature (Tg) or a temperature higher than that, or a film in which an appropriate solvent (including an organic solvent and water) or solvent vapor is contained so as to decrease the apparent Tg of the film, may be stretched.

In the production method of an optical film of the present invention, continuous stretching of continuously stretching a lengthy film continuously produced is preferred in view of productivity, but the stretching needs not be continuous stretching. That is, the produced film may be conveyed and stretched by a stretching apparatus disposed directly thereafter, or the produced film may be once taken up, again delivered to a stretching device, and then stretched.

As regards the stretching/shrinking device for specifically performing the above-described stretching step of stretching either the longitudinal direction or the width, the shrinking step of shrinking the other direction, and the step of increasing the film thickness, for example, a FITZ machine manufactured by Ichikin Industry Co., Ltd. may be suitably used. This stretching machine is described in JP-A-2001-38802.

(Preferred Stretch Ratio)

In the production method of an optical film of the present invention, in order to obtain desired wavelength dispersion of Re and Rth of the optical film, a method passing through a tenter stretching step of stretching the film in the width direction, a step of shrinking the film in the longitudinal direction (machine transportation direction), and a step of increasing the film thickness is preferred. Alternatively, by changing the longitudinal direction and the width direction, a method passing through a step of freely stretching the film in the machine transportation direction (lengthwise direction), a step of stretching the film while keeping the vertical direction (transverse direction) in the neck-in state, and a step of increasing the film thickness is also preferred.

According to such a method, the refractive index in the thickness direction is increased while orienting the polymer chain to the side having a high stretch ratio, whereby Rth(550) can be decreased and desired optical performance can be achieved. In the description below, stretch and shrinkage ratio, and rate of change in the film thickness are defined as compared with the film before the stretching step and/or the shrinkage step. In this method, the stretch ratio in the stretching direction (longitudinal or width direction) is preferably from 1.05 to 5.0 times, more preferably from 1.1 to 4.0 times.

At this time, the stretch ratio in the direction (transverse direction) perpendicular to the stretching direction is from 0.3 to 1.0 times, preferably from 0.35 to 0.95 times (because of shrinkage, the stretch ratio is smaller than 1).

The rate of change in the film thickness increased is from 1.02 to 2.0 times, preferably from 1.04 to 1.8 times (the rate of change being larger than 1 indicates that the film thickness is increased).

[Aspect Ratio of Stretched and Shrunk Film]

Assuming that the distance between fixing members for fixing the film at the stretching and shrinking is L, the direction perpendicular to between the fixing members is W and the aspect ratio of the film shape at the stretching is L/W, the aspect ratio is preferably from 0.1 to 10, more preferably from 0.1 to 8.0.

(Heat Treatment after Stretching and Shrinking)

In the production method of an optical film of the present invention, the optical film after stretching and shrinking may be heat-treated at a temperature from 10 to 50° C. higher than the stretching and shrinking temperature. This is a step called heat-setting which is applied to plastics in general, and the orientation degree of polymer chains locally disturbed by stretching can be increased. At this time, so-called crystal growth of the polymer film can also be promoted, and this treatment can be preferably used for creating the desired optical performance of the optical film of the present invention. The temperature of the heat treatment here is preferably from 10 to 45° C. higher than the stretching and shrinking temperature, more preferably from 10 to 40° C. higher than the stretching and shrinking temperature. If the difference between the stretching and shrinking temperature and the heat-treatment temperature is less than 10° C., the effect is small, whereas if the heat-treatment temperature is 50° C. or more higher than the stretching and shrinking temperature, the crystallization in the film is strongly promoted and this may cause an adverse effect such as increase of haze of the film.

[Thickness of Film]

In the production method of an optical film of the present invention, the thickness of the optical film before stretching is preferably from 10 to 300 μm, more preferably from 20 to 280 μm, still more preferably from 40 to 250 μm.

The method of increasing the film thickness after stretching and shrinking is not particularly limited but, for example, the film thickness is preferably increased by shrinking the film under heating.

A method of increasing the thickness of the optical film of the present invention by using a film of which thickness is shrunk under heating, for at least one surface of the optical film of the present invention, may also be used.

[Width of Film]

In the production method of an optical film of the present invention, the width of the optical film before stretching and shrinking is preferably from 5 cm to 3 m, more preferably from 8 cm to 2.5 m, still more preferably from 10 cm to 2 m.

[Haze of Film after Stretching and Shrinking]

The optical film is preferably transparent. The haze readily increases particularly in the optical film after stretching and shrinking, and cares should be taken. The haze value is from 0 to 2%, preferably from 0 to 1.6%, more preferably from 0 to 1.2%. The entire beam transmittance is preferably 85% or more. The haze can be measured by a haze meter (HGM-2DP, manufactured by Suga Test Instruments Co., Ltd.) according to JIS K-6714.

The optical film of the present invention is preferably produced using the above-described production method of an optical film of the present invention.

According to this production method, the optical film of the present invention satisfying formulae (1) to (6) can be produced, and an optical film having a high contrast ratio over a wide range and capable of suppressing the color shift can be obtained.

[Optically-Compensatory Film]

The optically-compensatory film of the present invention is obtained by further forming an optically anisotropic layer satisfying the following formula (7) on the optical film of the present invention.

$$Re(550)=0 \text{ to } 200 \text{ (nm) and } |Rth(550)|=0 \text{ to } 300 \text{ (nm)} \tag{7}$$

The optically anisotropic layer preferably comprises a liquid crystalline compound or a polymer film.

The optically anisotropic layer is not limited to a single layer structure and may have a laminate structure where a plurality of layers are stacked. The material may not be the same among layers and, for example, an optically anisotropic layer using a rod-like liquid crystal and an optically anisotropic layer using a discotic liquid crystal may be used individually or in combination. The optically anisotropic layer may also be a laminate of a polymer film and an optically anisotropic layer comprising a liquid crystalline compound. Considering the thickness, the optically anisotropic layer is preferably a layer formed by coating rather than a polymer stretched film laminate.

(Optically-Compensatory Film where Optically Anisotropic Layer Contains Layer Formed from Liquid Crystalline Layer)

In the case of using a liquid crystalline compound for the production of the optically-compensatory film, since the liquid crystalline compound has various orientation modes, the optically anisotropic layer produced by fixing the liquid crystalline compound in a specific alignment state exerts desired optical property in the form of a single layer or a laminate comprising a plurality of layers. That is, the optically-compensatory film may comprise a support comprising the optical film of the present invention and one or more optically anisotropic layers formed on the support. The retardation of the entire optically-compensatory film in such an embodiment can be adjusted by the optical anisotropy of the optically anisotropic layer. The liquid crystalline compound can be classified, by the molecular shape, into a discotic liquid crystalline molecule and a rod-like liquid crystalline molecule, and the compounds having these molecules can be classified into a discotic liquid crystal compound and a rod-like liquid crystal compound, respectively. Each compound has a low molecular type and a polymer type, and both may be used. In the case of using a liquid crystalline compound for the production of the optically-compensatory film, a rod-like liquid crystalline compound or a discotic liquid crystalline compound is preferably used, and a rod-like liquid crystal compound having a polymerizable group or a discotic liquid crystalline compound having a polymerizable group is more preferably used.

(Optically Anisotropic Layer Comprising Polymer Film)

As describe above, the optically anisotropic layer may be formed from a polymer film. The polymer film is formed from a polymer capable of developing optical anisotropy.

Examples of such a polymer include a polyolefin (e.g., polyethylene, polypropylene, norbornene-based polymer), a polycarbonate, a polyarylate, a polysulfone, a polyvinyl alcohol, a polymethacrylic acid ester, a polyacrylic acid ester and a cellulose ester (e.g., cellulose triacetate, cellulose diacetate). Also, a copolymer or polymer mixture of these polymers may be used.

The optical anisotropy of the polymer film is preferably obtained by stretching. The stretching is preferably uniaxial stretching or biaxial stretching. More specifically, longitudinal uniaxial stretching utilizing the peripheral velocity difference of two or more rolls, tenter stretching of stretching the polymer film in the width direction by gripping both sides, or biaxial stretching using these in combination is preferred. It is also possible to use two or more sheets of the polymer film such that the optical property of the entire film comprising two or more sheets of the polymer film satisfies the above-described conditions. The polymer film is preferably produced by a solvent casting method so as to reduce unevenness of the birefringence. The thickness of the polymer film is preferably from 20 to 500 µm, and most preferably from 40 to 100 µm.

A method where at least one polymer material selected from the group consisting of polyamide, polyimide, polyester, polyether ketone, polyamidoimide polyesterimide and polyaryl ether ketone is used as the polymer film forming the optically anisotropic layer, a solution obtained by dissolving the polymer material in a solvent is coated on a substrate, and a film is formed by drying the solvent, is also preferred. At this time, a method of stretching the polymer film and the substrate to develop the optical anisotropy and using the stretched film as the optically anisotropic layer may also be preferably used. The transparent film of the present invention can be preferably used as the substrate above. It is also preferred that the polymer film is produced on a different substrate, separated from the substrate and then laminated with the transparent film of the present invention, and the laminate is used as the optically anisotropic layer. According to this technique, the thickness of the polymer film can be reduced and the thickness is preferably 50 µm or less, more preferably from 1 to 20 µm.

[Polarizing Plate]

The polarizing plate of the present invention comprises at least one of the optical film of the present invention and the optically-compensatory film of the present invention.

In the case where the optical film of the present invention is used as a phase difference film having an optically compensating ability, the phase difference film having an optically compensating ability may be laminated through an adhesive to a polarizing plate produced by already laminating a protective film to both surfaces of a polarizing film. Furthermore, the optical film of the present invention may be laminated directly to a polarizing film, as a protective film of polarizing plate. In this case, the method of producing, for example, a polyvinyl alcohol-based polarizing plate is not particularly limited, and the polarizing plate may be produced by a general method. Examples thereof include a method where the optical film is surface-modified by an alkali saponification treatment, a plasma treatment, a corona discharge treatment or the like and laminated to both surfaces of a polarizing film produced by dipping and stretching a polyvinyl alcohol film (PVA) in an iodine solution.

In a liquid crystal display device, a substrate containing a liquid crystal is usually disposed between two polarizing plate, and the polarizing plate using the optical film of the present invention may be disposed at either site.

The structure of the polarizing plate of the present invention and one embodiment of the usage of the polarizing plate of the present invention are described below by referring to the drawings.

Figure 2:
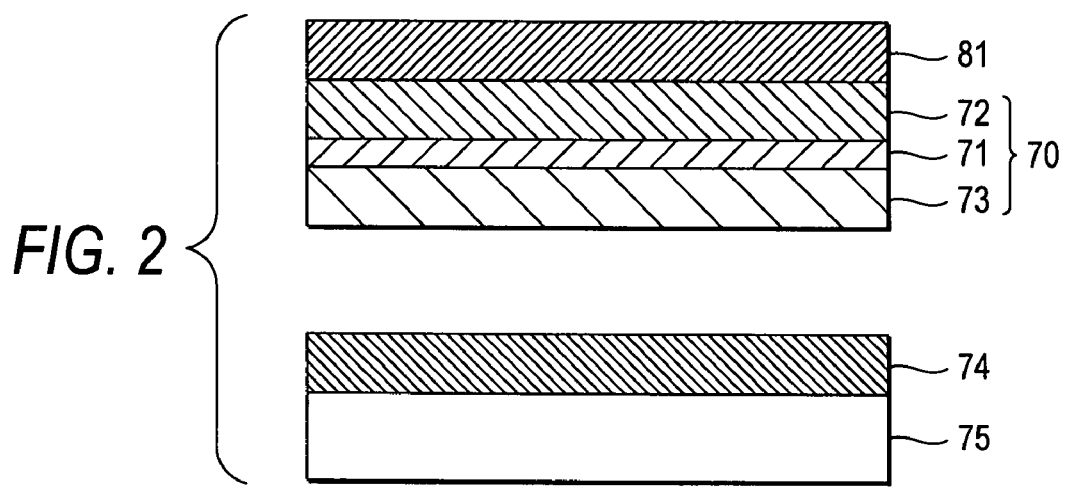
FIG. 2 is a view schematically showing the cross-sectional structure in another example of the polarizing plate of the present invention.

FIG. 1 is a view schematically showing the cross-sectional structure in one example of the polarizing plate of the present invention (for the sake of explanation, the glass for a liquid crystal cell is also shown). In FIG. 1, protective films 72 and 73 are provided on both surfaces of a polarizer 71, and at least one of these protective films is the optical film of the present invention. This polarizing plate 70 is laminated with a glass 75 for liquid crystal cell through an adhesive layer 74. FIG. 2 is a view schematically showing the cross-sectional structure in another example of the polarizing plate of the present invention. The polarizing plate shown in FIG. 2 is an embodiment where a functional layer 81 described later is further provided on the polarizing plate 70 shown in FIG. 1.

[Functional Layer]

In the case where the optical film of the present invention is used as a protective film of polarizing plate in a liquid crystal display device, various functional layers (functional layer 81 in FIG. 2) may be provided on the surface. Examples of the functional layer include a cured resin layer (transparent hard-coat layer), an antiglare layer, an antireflection layer, an easy adhesion layer, an optically-compensatory layer, an orientation layer and a layer for preventing electrification of the liquid crystal layer. Examples of the functional layer and material with which the optical film of the present invention can be used include a surfactant, a slipping agent, a matting agent, an antistatic layer and a hardcoat layer. These are described in detail in *JIII Journal of Technical Disclosure*, No. 2001-1745, pp. 32-45, Japan Institute of Invention and Innovation (Mar. 15, 2001), and the contents described therein can be preferably used in the present invention.

[Liquid Crystal Display Device]

The liquid crystal display device of the present invention comprises at least any one of the optical film of the present invention, the optically-compensatory film of the present invention, and the polarizing plate of the present invention.

In the liquid crystal display device of the present invention, the optical film, the optically-compensatory film, the liquid crystal cell and the polarizing plate are preferably tightly adhering and for achieving the tight adhesion, a known pressure-sensitive adhesive or adhesive may be used.

In the liquid crystal display device of the present invention, various optical films such as prism sheet and diffusing film may be used between those members such as optical film, liquid crystal cell and polarizing plate.

The optical film of the present invention and the optically-compensatory film or polarizing plate using the optical film can be used for liquid crystal display devices in various display modes. As representative display modes, there are proposed various display modes such as VA (vertically aligned), OCB (optically compensatory bend), IPS (in-plane switching), TN (twisted nematic), STN (super twisted nematic), ECB (electrically controlled birefringence), FLC (ferroelectric liquid crystal), AFLC (anti-ferroelectric liquid crystal) and HAN (hybrid aligned nematic). A display mode obtained by orientation-dividing the display mode above is also proposed. The film improved in the physical properties of the present invention is effective particularly for a large-screen liquid crystal display device and in this meaning, is preferably used for VA-mode, OCB-mode, IPS-mode liquid crystal display devices which are used for a large TV.

Particularly, if the optical film of the present invention is used in an IPS mode liquid crystal display, by using an optical film having almost zero of both a in-plane retardation and a retardation in a thickness direction, IPS liquid crystal cell and the optical film of the present invention in combination in this order from backlight side of the liquid crystal display to a viewer side, preferable display performance can be obtained.

The preferred values of the in-plane retardation and retardation in a thickness-direction of the optical film slightly vary depending on the retardation value in a thickness-direction of the liquid crystal and the average refractive index n of the liquid crystal and optical film and are preferably optimized according to the purpose.

FIG. 3 shows a construction example of the liquid crystal display device of the present invention.

In FIG. 3, protective films 72 and 73 are provided on both surfaces of a polarizer 71, and at least one of these protective films is the optical film of the present invention. The optical film of the present invention is preferably provided on the liquid cell side. On the protective film 72 (viewer side), a functional layer 81 is provided. This polarizing plate 70 is laminated on a glass 92 for liquid crystal cell through an adhesive layer 74. The liquid crystal cell 90 is formed by sandwiching a liquid crystal layer 91 with glasses 92 and 93 for liquid crystal cell, and a polarizing plate 70' is laminated to the glass 93 for liquid crystal cell on the light source side through an adhesive layer 74'. The polarizing plate 70' is obtained by providing protective films 72' and 73' on both surfaces of a polarizer 71'. In the present invention, it may suffice if either one or both of the polarizing plate 70 and the polarizing plate 70' have the optical film of the present invention.

EXAMPLES

The present invention is described in greater detail below by referring to Examples, but the present invention is not limited thereto. In the description below, stretch and shrinkage ratio, and rate of change in the film thickness are defined as compared with the film before the stretching step and/or the shrinkage step.

Example 1-1

Production of Cellulose Acylate Solution CA-1

Cellulose Acylate Solution CA-1 is prepared by charging the following composition into a mixing tank and stirring it to dissolve respective components. Here, Ac indicates an acetyl group.

| (Composition of Cellulose Acylate Solution CA-1) | |
| --- | --- |
| Cellulose acetate having Ac substitution degree of 2.81 | 100.0 parts by mass |
| TPP (triphenyl phosphate) | 7.8 parts by mass |
| BDP (biphenyl diphenyl phosphate) | 3.9 parts by mass |
| Methylene chloride (first solvent) | 402.0 parts by mass |
| Methanol (second solvent) | 60.0 parts by mass |

(Preparation of Matting Agent Solution MT-1)

20 Parts by mass of silica particle having an average particle diameter of 16 nm (AEROSIL R972, produced by Nihon Aerosil Co., Ltd.) and 80 parts by mass of methanol are thoroughly mixed with stirring for 30 minutes to prepare a silica particle liquid dispersion. This liquid dispersion is charged into a disperser together with the composition shown below and further stirred for 30 minutes or more to dissolve respective components, thereby preparing Matting Agent Solution MT-1.

| (Composition of Matting Agent Solution MT-1) | |
| --- | --- |
| Silica particle liquid dispersion having an average particle diameter of 16 nm | 10.0 parts by mass |
| Methylene chloride (first solvent) | 76.3 parts by mass |
| Methanol (second solvent) | 3.4 parts by mass |
| Cellulose Acylate Solution CA-1 | 10.3 parts by mass |

(Preparation of Additive Solution)

Additive Solution AD-1 is prepared by charging the following composition into a mixing tank and stirring it under heating to dissolve respective components. A retardation developer (Compound X) shown below is used.

| (Composition of Additive Solution AD-1) | |
| --- | --- |
| Retardation developer shown below (Compound X) | 7.6 parts by mass |
| Methylene chloride (first solvent) | 58.4 parts by mass |
| Methanol (second solvent) | 8.7 parts by mass |
| Cellulose Acylate Solution CA-1 | 12.8 parts by mass |

Compound X:
(446)

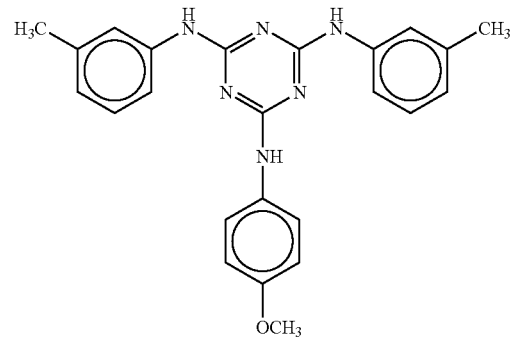

(Preparation of Cellulose Acylate Film Sample 101)

94.6 Parts by mass of Cellulose Acylate Solution CA-1, 1.3 parts by mass of Matting Agent Solution MT-1, and 2.3 parts by mass of Additive Solution AD-1 are mixed after filtering each solution, and the mixture is cast using a band casting machine. In the composition above, the mass ratio of the retardation developer to the cellulose acylate is 1.0%. The film having a residual solvent amount of 30% is separated from the band and dried at 140° C. for 40 minutes to produce a cellulose acylate film. The finished Cellulose Acylate Film 101 has a residual solvent amount of 0.2% and a thickness of 100 μm.

(Production of Optical Film 111)

Cellulose Acylate Film 101 obtained above is fed to a stretching apparatus having a step of stretching the film in the width direction by using a tenter having such a construction as that the distance between tenter clips in the longitudinal direction becomes narrow while gripping and conveying a continuous lengthy film. The film temperature is set at 180° C. and after 30 seconds, the film is passed through a heating zone. Thereafter, stretching is started. The film is shrunk to 0.85 times in the longitudinal direction and stretched to 1.25 times in the width direction by using the tenter clips, whereby Optical Film 111 having a thickness of 125 μm after stretching is obtained.

Example 1-2

Production of Optical Film 112

Cellulose Acylate Film 101 obtained above is fed to the same stretching apparatus as used in Example 1-1. The film temperature is set at 190° C. and after 30 seconds, the film is passed through a heating zone. Thereafter, stretching is started. The film is shrunk to 0.85 times in the longitudinal direction and stretched to 1.25 times in the width direction by using the tenter clips, whereby Optical Film 112 having a thickness of 135 μm after stretching is obtained.

Example 1-3

Production of Optical Film 113

Cellulose Acylate Film 101 obtained above is fed to the same stretching apparatus as used in Example 1-1. The film temperature is set at 175° C. and after 30 seconds, the film is passed through a heating zone. Thereafter, stretching is started. The film is relaxed and 0.85 times in the longitudinal direction and stretched to 1.25 times in the width direction by using the tenter clips, whereby Optical Film 113 having a thickness of 115 μm after stretching is obtained.

Example 1-4

Production of Optical Film 114

Cellulose Acylate Film 101 obtained above is fed to the same stretching apparatus as used in Example 1-1. The film temperature is set at 170° C. and after 30 seconds, the film is passed through a heating zone. Thereafter, stretching is started. The film is shrunk to 0.85 times in the longitudinal direction and stretched to 1.25 times in the width direction by using the tenter clips, whereby Optical Film 114 having a thickness of 110 μm after stretching is obtained.

The films obtained in Examples above each is humidity-conditioned for 2 hours or more under an environment of 25° C. and 60% RH, and measurement of three-dimensional birefringence is performed at wavelengths of 450 nm, 550 nm and 650 nm by using an automatic birefringence meter KOBRA 21ADH (manufactured by Oji Test Instruments). The in-plane retardation Re and the retardation Rth in a thickness-direction which is obtained by measuring Re while changing the inclination angle are determined, as a result, each film is found to have the optical performance shown in Table 1. Film samples of the following Examples and Comparative Examples are evaluated in the same manner.

Example 2

Production of Optical Film 211

Cellulose Acylate Film 101 obtained in Example 1 is fed to a stretching apparatus having a step of stretching the film in the longitudinal direction by using a tenter having such a construction as that the distance between tenter clips in the longitudinal direction becomes broad while gripping and conveying a continuous lengthy film. The film temperature is set at 180° C. and after 30 seconds, the film is passed through a heating zone. Thereafter, stretching is started. The film is stretched to 1.25 times in the longitudinal direction and shrunk to 0.72 times in the width direction while holding the film with the tenter clips, whereby Optical Film 211 having a thickness of 130 μm after stretching and having the optical performance shown in Table 1 is obtained.

Example 3

Production of Cellulose Acylate Solution CA-2

Cellulose Acylate Solution CA-2 is prepared by charging the following composition into a mixing tank and stirring it to dissolve respective components. Here, Ac indicates an acetyl group, and Pro indicates a propionyl group.

| (Composition of Cellulose Acylate Solution CA-2) | |
|---|---|
| Cellulose acylate having Ac substitution degree of 2.06 + Pro substitution degree of 0.79 | 100.0 parts by mass |
| TPP (triphenyl phosphate) | 7.8 parts by mass |
| BDP (biphenyl diphenyl phosphate) | 3.9 parts by mass |
| Methylene chloride (first solvent) | 402.0 parts by mass |
| Methanol (second solvent) | 60.0 parts by mass |

(Preparation of Matting Agent Solution Mt-2)

20 Parts by mass of silica particle having an average particle diameter of 16 nm (AEROSIL R972, produced by Nihon Aerosil Co., Ltd.) and 80 parts by mass of methanol are thoroughly mixed with stirring for 30 minutes to prepare a silica particle liquid dispersion. This liquid dispersion is charged into a disperser together with the composition shown below and further stirred for 30 minutes or more to dissolve respective components, thereby preparing Matting Agent Solution MT-2.

| (Composition of Matting Agent Solution MT-2) | |
|---|---|
| Silica particle liquid dispersion having an average particle diameter of 16 nm | 10.0 parts by mass |
| Methylene chloride (first solvent) | 76.3 parts by mass |
| Methanol (second solvent) | 3.4 parts by mass |
| Cellulose Acylate Solution CA-2 | 10.3 parts by mass |

(Preparation of Additive Solution)

Additive Solution AD-2 is prepared by charging the following composition into a mixing tank and stirring it under heating to dissolve respective components. A retardation developer (Compound X; Discotic Compound (446)) shown below is used.

| (Composition of Additive Solution AD-2) | |
|---|---|
| Retardation developer shown below (Compound X) | 7.6 parts by mass |
| Methylene chloride (first solvent) | 58.4 parts by mass |
| Methanol (second solvent) | 8.7 parts by mass |
| Cellulose Acylate Solution CA-2 | 12.8 parts by mass |

Compound X:
(446)

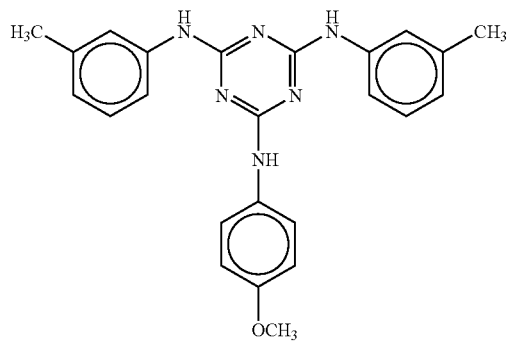

(Preparation of Cellulose Acylate Film Sample 301)

94.6 Parts by mass of Cellulose Acylate Solution CA-2, 1.3 parts by mass of Matting Agent Solution MT-2, and 2.3 parts by mass of Additive Solution AD-2 are mixed after filtering each solution, and the mixture is cast using a band casting machine. In the composition above, the mass ratio of the retardation developer to the cellulose acylate is 1.0%. The film having a residual solvent amount of 30% is separated from the band and dried at 140° C. for 40 minutes to produce a cellulose acylate film. The finished cellulose acylate film has a residual solvent amount of 0.2% and a thickness of 100 μm.

(Production of Optical Film 311)

Cellulose Acylate Film 301 obtained above is fed to the same stretching apparatus as used in Example 1-1. The film temperature is set at 160° C. and after 30 seconds, the film is passed through a heating zone. Thereafter, stretching is started. The film is shrunk to 0.84 times in the longitudinal direction and stretched to 1.25 times in the width direction by using the tenter clips, whereby Optical Film 311 having a thickness of 125 μm after stretching and having the optical performance shown in Table 1 is obtained.

Example 4

Production of Cellulose Acylate Solution CA-3

Cellulose Acylate Solution CA-3 is prepared by charging the following composition into a mixing tank and stirring it to dissolve respective components. Here, Ac indicates an acetyl group.

| (Composition of Cellulose Acylate Solution CA-3) | |
| --- | --- |
| Cellulose acetate having Ac substitution degree of 2.92 | 100.0 parts by mass |
| TPP (triphenyl phosphate) | 7.8 parts by mass |
| BDP (biphenyl diphenyl phosphate) | 3.9 parts by mass |
| Methylene chloride (first solvent) | 402.0 parts by mass |
| Methanol (second solvent) | 60.0 parts by mass |

(Preparation of Matting Agent Solution Mt-3)

20 Parts by mass of silica particle having an average particle diameter of 16 nm (AEROSIL R972, produced by Nihon Aerosil Co., Ltd.) and 80 parts by mass of methanol are thoroughly mixed with stirring for 30 minutes to prepare a silica particle liquid dispersion. This liquid dispersion is charged into a disperser together with the composition shown below and further stirred for 30 minutes or more to dissolve respective components, thereby preparing Matting Agent Solution MT-3.

| (Composition of Matting Agent Solution MT-3) | |
| --- | --- |
| Silica particle liquid dispersion having an average particle diameter of 16 nm | 10.0 parts by mass |
| Methylene chloride (first solvent) | 76.3 parts by mass |
| Methanol (second solvent) | 3.4 parts by mass |
| Cellulose Acylate Solution CA-3 | 10.3 parts by mass |

(Preparation of Additive Solution)

Additive Solution AD-3 is prepared by charging the following composition into a mixing tank and stirring it under heating to dissolve respective components. A retardation developer (Compound Y; Rod-like Compound (41)) shown below is used.

| (Composition of Additive Solution AD-3) | |
| --- | --- |
| Retardation developer shown below (Compound Y) | 7.6 parts by mass |
| Methylene chloride (first solvent) | 58.4 parts by mass |
| Methanol (second solvent) | 8.7 parts by mass |
| Cellulose Acylate Solution CA-3 | 12.8 parts by mass |

Compound Y:

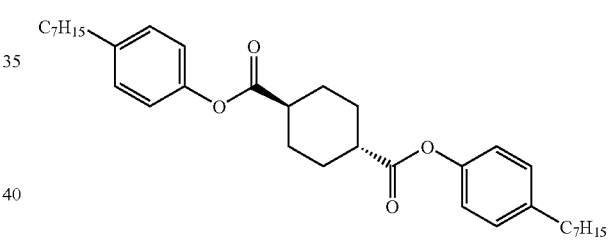

(Production of Cellulose Acylate Film Sample 401)

94.6 Parts by mass of Cellulose Acylate Solution CA-3, 1.3 parts by mass of Matting Agent Solution MT-3, and 2.3 parts by mass of Additive Solution AD-3 are mixed after filtering each solution, and the mixture is cast using a band casting machine. In the composition above, the mass ratio of Retardation Developer Y to the cellulose acylate is 1.0%. The film having a residual solvent amount of 30% is separated from the band and dried at 140° C. for 40 minutes to produce a cellulose acylate film. The finished cellulose acylate film has a residual solvent amount of 0.2% and a thickness of 100 μm.

(Production of Optical Film 411)

Cellulose Acylate Film 401 obtained above is fed to the same stretching apparatus as used in Example 1-1. The film temperature is set at 180° C. and after 30 seconds, the film is passed through a heating zone. Thereafter, stretching is started. The same operation as in Example 1-1 is performed except for shrinking the longitudinal direction of the film to 0.70 times and stretching the width direction to 1.32 times by using the tenter clips, whereby Optical Film 411 having a thickness of 140 μm after stretching and having the optical performance shown in Table 1 is obtained.

Comparative Example 1

Production of Comparative Sample 001

Cellulose Acylate Film 101 obtained in Example 1-1 is fixed and uniaxially stretched. The temperature of Film 101 is set at 180° C. and after 30 seconds, the film is passed through a heating zone. Thereafter, stretching is started. The longitudinal direction of the film is fixed and kept at 1.00 times and the width direction is stretched to 1.25 times by using tenter clips, whereby Sample Film 001 of Comparative Example having a thickness of 92 µm after stretching and having the optical performance shown in Table 1 is obtained.

Comparative Example 2

Production of Comparative Sample 002

Cellulose Acylate Film 101 obtained in Example 1-1 is fixed and uniaxially stretched. The temperature of Film 101 is set at 180° C. and after 30 seconds, the film is passed through a heating zone. Thereafter, stretching is started. The longitudinal direction of the film is fixed and kept at 1.00 times and the width direction is stretched to 1.10 times by using tenter clips, whereby Sample Film 002 of Comparative Example having a thickness of 95 µm after stretching and having the optical performance shown in Table 1 is obtained.

Comparative Example 3

Production of Comparative Sample 003

Cellulose Acylate Film 401 obtained in Example 4 is fixed and uniaxially stretched. The temperature of Film 401 is set at 180° C. and after 30 seconds, the film is passed through a heating zone. Thereafter, stretching is started. The longitudinal direction of the film is fixed and kept at 1.00 times and the width direction is stretched to 1.35 times by using tenter clips, whereby Sample Film 003 of Comparative Example having a thickness of 72 µm after stretching and having the optical performance shown in Table 1 is obtained.

The composition, film-forming method and optical properties of the optical film of the present invention, and the performance when mounted in a liquid crystal display device are shown in Table 1.

TABLE 1

| Sample name | | Example 1-1 111 | Example 1-2 112 | Example 1-3 113 | Example 1-4 114 |
|---|---|---|---|---|---|
| | Raw material polymer | Ac 2.81 | Ac 2.81 | Ac 2.81 | Ac 2.81 |
| | Retardation developer (wt %) | Compound X (1.0%) | Compound X (1.0%) | Compound X (1.0%) | Compound X (1.0%) |
| Thickness (µm) | Before Stretching/Shrinking | 100 | 100 | 100 | 100 |
| | After Stretching/Shrinking | 125 | 135 | 115 | 110 |
| Stretching/ shrinking ratio | Longitudinal (lengthwise) direction | 0.85 | 0.85 | 0.85 | 0.85 |
| | Width (transverse) direction | 1.25 | 1.25 | 1.25 | 1.25 |
| | Thickness direction | 1.25 | 1.35 | 1.15 | 1.10 |
| Heating temperature (° C.) | | 180 | 190 | 175 | 170 |
| Re (nm) | 450 | 210 | 205 | 210 | 215 |
| | 550 | 270 | 270 | 270 | 270 |
| | 650 | 308 | 310 | 298 | 298 |
| | 450/550 | 0.78 | 0.76 | 0.78 | 0.80 |
| | 650/550 | 1.14 | 1.15 | 1.10 | 1.10 |
| Rth (nm) | 450 | 13 | −33 | 44 | 63 |
| | 550 | 10 | −25 | 40 | 58 |
| | 650 | 8 | −20 | 38 | 55 |
| | 450/550 | 1.30 | 1.32 | 1.10 | 1.09 |
| | 650/550 | 0.80 | 0.80 | 0.95 | 0.95 |
| (Re450/Rth450)/(Re550/Rth550) | | 0.60 | 0.58 | 0.71 | 0.73 |
| (Re650/Rth650)/(Re550/Rth550) | | 1.43 | 1.44 | 1.16 | 1.16 |
| Example 5 (tint change of IPS panel) (azimuthal angle: 45°, polar angle: 60°, black display time) | | A no coloration | | | A no coloration |
| Example 6 (tint change of IPS panel) (azimuthal angle: 45°, polar angle: 60°, black display time) | | A no coloration | | | A no coloration |

| Sample name | | Example 2 211 | Example 3 311 | Example 4 411 | Comparative Example 1 001 |
|---|---|---|---|---|---|
| | Raw material polymer | Ac 2.81 | Ac 2.06 Pro 0.79 | Ac 2.92 | Ac 2.81 |
| | Retardation developer (wt %) | Compound X (1.0%) | Compound X (1.0%) | Compound Y (1.0%) | Compound X (1.0%) |
| Thickness (µm) | Before Stretching/Shrinking | 100 | 100 | 100 | 100 |
| | After Stretching/Shrinking | 130 | 125 | 140 | 92 |

TABLE 1-continued

| | | | | | |
|---|---|---|---|---|---|
| Stretching/shrinking ratio | Longitudinal (lengthwise) direction | 1.25 | 0.84 | 0.70 | 1.00 |
| | Width (transverse) direction | 0.72 | 1.25 | 1.32 | 1.25 |
| | Thickness direction | 1.30 | 1.25 | 1.40 | 0.92 |
| Heating temperature (° C.) | | 180 | 160 | 180 | 180 |
| Re (nm) | 450 | 207 | 220 | 210 | 265 |
| | 550 | 265 | 265 | 270 | 256 |
| | 650 | 305 | 287 | 310 | 242 |
| | 450/550 | 0.78 | 0.83 | 0.78 | 1.04 |
| | 650/550 | 1.15 | 1.08 | 1.15 | 0.95 |
| Rth (nm) | 450 | 32 | 26 | 1.2 | 132 |
| | 550 | 27 | 25 | 1.2 | 125 |
| | 650 | 24 | 24 | 1.3 | 119 |
| | 450/550 | 1.19 | 1.04 | 1.00 | 1.06 |
| | 650/550 | 0.89 | 0.96 | 1.08 | 0.95 |
| (Re450/Rth450)/(Re550/Rth550) | | 0.66 | 0.80 | 0.78 | 0.98 |
| (Re650/Rth650)/(Re550/Rth550) | | 1.29 | 1.13 | 1.06 | 0.99 |
| Example 5 (tint change of IPS panel) (azimuthal angle: 45°, polar angle: 60°, black display time) | | | | | B coloration |
| Example 6 (tint change of IPS panel) (azimuthal angle: 45°, polar angle: 60°, black display time) | | | | | B coloration |

| Sample name | | Comparative Example 2 002 | Comparative Example 3 003 |
|---|---|---|---|
| | Raw material polymer | Ac 2.81 | Ac 2.92 |
| | Retardation developer (wt %) | Compound X (1.0%) | Compound Y (1.0%) |
| Thickness (μm) | Before Stretching/Shrinking | 100 | 100 |
| | After Stretching/Shrinking | 95 | 72 |
| Stretching/shrinking ratio | Longitudinal (lengthwise) direction | 1.00 | 1.00 |
| | Width (transverse) direction | 1.10 | 1.35 |
| | Thickness direction | 0.95 | 0.72 |
| Heating temperature (° C.) | | 180 | 180 |
| Re (nm) | 450 | 145 | 336 |
| | 550 | 135 | 320 |
| | 650 | 130 | 311 |
| | 450/550 | 1.07 | 1.05 |
| | 650/550 | 0.96 | 0.97 |
| Rth (nm) | 450 | 84 | 150 |
| | 550 | 75 | 140 |
| | 650 | 72 | 133 |
| | 450/550 | 1.12 | 1.07 |
| | 650/550 | 0.96 | 0.95 |
| (Re450/Rth450)/(Re550/Rth550) | | 0.96 | 0.98 |
| (Re650/Rth650)/(Re550/Rth550) | | 1.00 | 1.02 |
| Example 5 (tint change of IPS panel) (azimuthal angle: 45°, polar angle: 60°, black display time) | | C coloration, light leakage | B coloration |
| Example 6 (tint change of IPS panel) (azimuthal angle: 45°, polar angle: 60°, black display time) | | C coloration, light leakage | B coloration |

(Processing into Polarizing Plate)

The optical film samples of the present invention obtained in Examples and the samples obtained in Comparative Examples each is laminated to a commercially available polarizing plate (HLC2-5618, manufactured by Sanritz K.K.) by using a pressure-sensitive adhesive and processed into a phase difference film-integrated polarizing plate.

Example 5

Evaluation of Mounting in IPS Panel

A polarizer is produced by adsorbing iodine to a stretched polyvinyl alcohol film. Separately, the surface of Optical Film 111 produced in Example 1 is dipped in an aqueous 1.5 N sodium hydroxide solution at 55° C. for 2 minutes, and the film is then washed in a water-washing bath at room temperature, further neutralized using 0.1 N sulfuric acid at 30° C., again washed in a water-washing bath at room temperature and dried with hot air at 100° C. In this way, the surface of the cellulose acylate film is saponified. This alkali-saponified Optical Film 111 is laminated to one side of the polarizer by using a polyvinyl alcohol-based adhesive. At this time, the slow axis of Optical Film 111 and the transmission axis of the polarizer are arranged to run in parallel. As the protective film, a commercially available cellulose triacetate film (FUJI-TAC TD80UF, produced by Fuji Photo Film Co., Ltd.) is saponified in the same manner and laminated to the opposite side (the side where the optical film is not laminated) of the polarizer. In this way, a polarizing plate-integrated phase difference film is produced. Using Samples 114 of Example and Samples 001 to 003 of Comparative Examples, polarizing plate-integrated phase difference films are also produced by the same operation.

The thus-produced polarizing plate-integrated phase difference film, an IPS-type liquid crystal cell and a commercially available polarizing plate (HCL2-5618, manufactured by Sanritz K.K.) are laid one another in this order from above and laminated using a pressure-sensitive adhesive to produce an display device having a layer construction shown in FIG. 4, where the optical film is incorporated. At this time, the transmission axes of upper and lower polarizing plates are crossed at right angles, and the transmission axis of the upper polarizing plate is arranged in parallel to the molecular long axis direction of the liquid crystal cell (that is, the slow axis of the optically-compensatory layer and the molecular long axis direction of the liquid crystal cell are crossed at right angles). As for the liquid crystal cell and the electrode and substrate, those conventionally employed for the IPS mode can be directly used. The alignment of the liquid crystal cell is parallel alignment, and a commercially available liquid crystal having positive dielectric anisotropy and being developed for IPS liquid crystal can be used. The physical properties of the liquid crystal cell are set to $\Delta n$ of liquid crystal: 0.099, cell gap of liquid crystal layer: 3.0 μm, pretilt angle: 5°, and rubbing direction: 75° for both upper and lower substrates. In FIG. 4, "protective TAC" means a protective film.

(Evaluation of Tint Dependent on Viewing Angle of Panel)

Samples each mounted in a liquid crystal display device according to the layer construction shown in FIG. 4 are evaluated on the tint change in the oblique direction at an azimuthal angle of 45° and a polar angle of 60° during the black display time of the screen. The tint is rated A when tint change (yellow or red tint) is not observed at all, rated B when tint change is observed at a polar angle of 60° but disappears as a result of returning the polar angle to 30° from 60°, and rated C when tint change is clearly observed at any polar angle. Samples using Optical Films 111 and 114 of the present invention produced in Examples both are almost free of coloration (tint change) even on viewing from the oblique direction and assured of no light leakage. On the other hand, when Samples 001 to 003 of Comparative Examples are viewed from the oblique direction, significant light leakage and coloration (slightly reddish) of the leaked light are confirmed. The measurement is performed also at the white display time of the screen and the contrast ratio with black display time is determined, as a result, samples using the optical film of the present invention all are found to have an excellent contrast ratio.

Example 6

Evaluation of Mounting in IPS Panel

A polarizer is produced by adsorbing iodine to a stretched polyvinyl alcohol film. Separately, the surface of Optical Film 111 produced in Example 1 is dipped in an aqueous 1.5 N sodium hydroxide solution at 55° C. for 2 minutes, and the film is then washed in a water-washing bath at room temperature, further neutralized using 0.1 N sulfuric acid at 30° C., again washed in a water-washing bath at room temperature and dried with hot air at 100° C. In this way, the surface of the cellulose acylate film is saponified. This alkali-saponified Optical Film 111 is laminated to one side of the polarizer by using a polyvinyl alcohol-based adhesive. At this time, the slow axis of Optical Film 111 and the transmission axis of the polarizer are arranged to run in parallel. As the protective film, a commercially available cellulose triacetate film (ZRF80S, produced by FUJIFILM Corporation), which has Re(550)=0 nm and Rth(550)=0 nm, is saponified in the same manner and laminated to the opposite side (the side where the optical film is not laminated) of the polarizer. In this way, a polarizing plate-integrated phase difference film is produced. Using Samples 114 of Example and Samples 001 to 003 of Comparative Examples, polarizing plate-integrated phase difference films are also produced by the same operation.

The thus-produced polarizing plate-integrated phase difference film, an IPS-type liquid crystal cell and a commercially available polarizing plate (HCL2-5618, manufactured by Sanritz K.K.) are laid one another in this order from above and laminated using a pressure-sensitive adhesive to produce an display device having a layer construction shown in FIG. 4, where the optical film is incorporated. At this time, the transmission axes of upper and lower polarizing plates are crossed at right angles, and the transmission axis of the upper polarizing plate is arranged in parallel to the molecular long axis direction of the liquid crystal cell (that is, the slow axis of the optically-compensatory layer and the molecular long axis direction of the liquid crystal cell are crossed at right angles). As for the liquid crystal cell and the electrode and substrate, those conventionally employed for the IPS mode can be directly used. The alignment of the liquid crystal cell is parallel alignment, and a commercially available liquid crystal having positive dielectric anisotropy and being developed for IPS liquid crystal can be used. The physical properties of the liquid crystal cell are set to $\Delta n$ of liquid crystal: 0.099, cell gap of liquid crystal layer: 3.0 μm, pretilt angle: 5°, and rubbing direction: 75° for both upper and lower substrates. In FIG. 4, "protective TAC" means a protective film.

(Evaluation of Tint Dependent on Viewing Angle of Panel)

Samples each mounted in a liquid crystal display device according to the layer construction shown in FIG. 4 are evaluated on the tint change in the oblique direction at an azimuthal angle of 45° and a polar angle of 60° during the black display time of the screen. The tint is rated A when tint change (yellow or red tint) is not observed at all, rated B when tint change is observed at a polar angle of 60° but disappears as a result of returning the polar angle to 30° from 60°, and rated C when tint change is clearly observed at any polar angle. Samples using Optical Films 111 and 114 of the present invention produced in Examples both are almost free of coloration (tint change) even on viewing from the oblique direction and assured of no light leakage. On the other hand, when Samples 001 to 003 of Comparative Examples are viewed from the oblique direction, significant light leakage and coloration (slightly reddish) of the leaked light are confirmed. The measurement is performed also at the white display time of the screen and the contrast ratio with black display time is determined, as a result, samples using the optical film of the present invention all are found to have an excellent contrast ratio.

As described in the foregoing pages, the optical film of the present invention, of which Re and Rth have desired performances, can produce an excellent film having a high contrast ratio over a wide range and functioning also as a phase difference film capable of suppressing the tint change. Furthermore, a polarizing plate using the film and a liquid crystal display device can be provided.

The present invention has been accomplished based on the knowledge obtained through intensive studies made by the present inventors, that is, wavelength dispersion of the in-plane retardation of an optical film and wavelength dispersion of the retardation in a thickness-direction are independently controlled to determine their optimal optical values so that viewing angle in the black state of a liquid crystal cell, particularly an IPS-mode liquid crystal cell, can be compensated in almost the entire region. As a result, the liquid crystal display device of the present invention is reduced in the light leakage in the oblique direction at the black display time and remarkably improved in the viewing angle contrast. Furthermore, in the liquid crystal display device of the present invention, light leakage in the oblique direction at the black display time can b suppressed in almost the entire visible light region and therefore, viewing angle-dependent color shift at the black display time, which has been conventionally a problem, can be greatly improved.

The entire disclosure of each and every foreign patent application from which the benefit of foreign priority has been claimed in the present application is incorporated herein by reference, as if fully set forth.

What is claimed is:

1. A production method of an optical film, comprising:
 a stretching step of stretching a film, wherein the film has a longitudinal direction, a width direction and a thickness direction, wherein the stretching is in either of the longitudinal direction or the width direction of the film; and
 a shrinking step of shrinking the film in either of the longitudinal direction or the width direction of the film, that is not the direction in which the film is stretched,
 wherein the film thickness in the thickness direction is increased as compared with the film thickness before at least one of the stretching step and the shrinking step;
 wherein the shrinking step is achieved by gripping the film with tenter clips, conveying the film, and narrowing the distance between the tenter clips in the conveying direction,
 wherein the optical film is a cellulose acylate film,
 wherein a stretch ratio in the stretching direction in the longitudinal or width direction is from 1.05 to 5.0 times.

2. The production method according to claim 1, wherein the film thickness is increased from 1.02 to 2.0 times.

3. The production method according to claim 1, wherein the film has an aspect ratio L/W of from 0.1 to 10 when stretched, wherein L represents a distance between fixing members for fixing the film when it is stretched or shrunk and W represents a direction perpendicular to the distance between the fixing members.

4. The production method according to claim 1, wherein a stretch ratio in a direction perpendicular to the stretching direction is from 0.3 to 1.0 times.

5. A production method of an optical film, comprising:
 a stretching step of stretching a film, wherein the film has a longitudinal direction, a width direction and a thickness direction, wherein the stretching is in either of the longitudinal direction or the width direction of the film; and
 a shrinking step of shrinking the film in either of the longitudinal direction or the width direction of the film, that is not the direction in which the film is stretched,
 wherein the film thickness in the thickness direction is increased as compared with the film thickness before at least one of the stretching step and the shrinking step;
 wherein the stretching step is achieved by gripping the film with tenter clips, conveying the film, and broadening the distance between the tenter clips in the conveying direction,
 wherein the optical film is a cellulose acylate film,
 wherein a stretch ratio in the stretching direction in the longitudinal or width direction is from 1.05 to 5.0 times.

6. The production method according to claim 5, wherein the film thickness is increased from 1.02 to 2.0 times.

7. The production method according to claim 5, wherein the film has an aspect ratio L/W of from 0.1 to 10 when stretched, where L represents a distance between fixing members for fixing the film when it is stretched or shrunk and W represents a direction perpendicular to the distance between the fixing members.

8. The production method according to claim 5, wherein a stretch ratio in a direction perpendicular to the stretching direction is from 0.3 to 1.0 times.

* * * * *